US012632326B2

(12) United States Patent
Lu et al.

(10) Patent No.: US 12,632,326 B2
(45) Date of Patent: May 19, 2026

(54) USAGE-BASED-DISTURBANCE ALERT SIGNALING

(71) Applicant: Micron Technology, Inc., Boise, ID (US)

(72) Inventors: Yang Lu, Boise, ID (US); Victor Wong, Boise, ID (US); Donald Morgan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/787,655

(22) Filed: Jul. 29, 2024

(65) Prior Publication Data

US 2025/0094262 A1 Mar. 20, 2025

Related U.S. Application Data

(60) Provisional application No. 63/583,477, filed on Sep. 18, 2023.

(51) Int. Cl.
*G06F 11/00* (2006.01)
*G06F 11/07* (2006.01)

(52) U.S. Cl.
CPC ........ *G06F 11/0772* (2013.01); *G06F 11/073* (2013.01); *G06F 11/079* (2013.01)

(58) Field of Classification Search
CPC ... G06F 11/0772; G06F 11/073; G06F 11/079
See application file for complete search history.

(56) References Cited

U.S. PATENT DOCUMENTS

| | | | |
|---|---|---|---|
| 2010/0122148 A1* | 5/2010 | Flynn | G11C 16/3422 |
| | | | 714/E11.034 |
| 2012/0210109 A1 | 8/2012 | Lasch et al. | |
| 2012/0284590 A1* | 11/2012 | Ku | G06F 11/0772 |
| | | | 714/799 |
| 2013/0290597 A1 | 10/2013 | Faber | |
| 2015/0200002 A1 | 7/2015 | Lin et al. | |
| 2019/0228813 A1 | 7/2019 | Nale et al. | |
| 2020/0111525 A1 | 4/2020 | Cowles et al. | |

(Continued)

OTHER PUBLICATIONS

"Non-Final Office Action", U.S. Appl. No. 18/820,249, filed Aug. 11, 2025, 16 pages.

(Continued)

*Primary Examiner* — Philip Guyton
(74) *Attorney, Agent, or Firm* — Colby Nipper PLLC

(57) ABSTRACT

Apparatuses and techniques for implementing usage-based-disturbance alert signaling are described. The technology allows usage-based-disturbance (UBD) alerts to be externally communicated from a memory device without a dedicated external interface. Rather, UBD alerts are combined with memory error/alert signals and communicated on a shared alert-related interface. UBD tracking occurs at the memory bank level, with corresponding independent UBD alert signals. These signals are efficiently combined to generate an overall UBD alert. A temporary backoff signal is generated when an overall UBD alert is sent. The backoff signal ensures requisite external timing parameters are met while allowing the individual memory banks to generate persistent UBD alerts.

20 Claims, 14 Drawing Sheets

(56) References Cited

U.S. PATENT DOCUMENTS

| | | |
|---|---|---|
| 2021/0224155 A1 | 7/2021 | Bains et al. |
| 2022/0051716 A1 | 2/2022 | Ayyapureddi |
| 2022/0113868 A1 | 4/2022 | Cowles et al. |
| 2023/0176790 A1 | 6/2023 | Dhuse et al. |
| 2024/0427497 A1 | 12/2024 | Lu |
| 2024/0428842 A1 | 12/2024 | Lu et al. |
| 2026/0064290 A1 | 3/2026 | Lu et al. |

OTHER PUBLICATIONS

"Non-Final Office Action", U.S. Appl. No. 18/743,309, filed Jan. 8, 2026, 14 pages.
"Notice of Allowance", U.S. Appl. No. 18/820,249, filed Mar. 5, 2026, 10 pages.

* cited by examiner

Figure 1A:
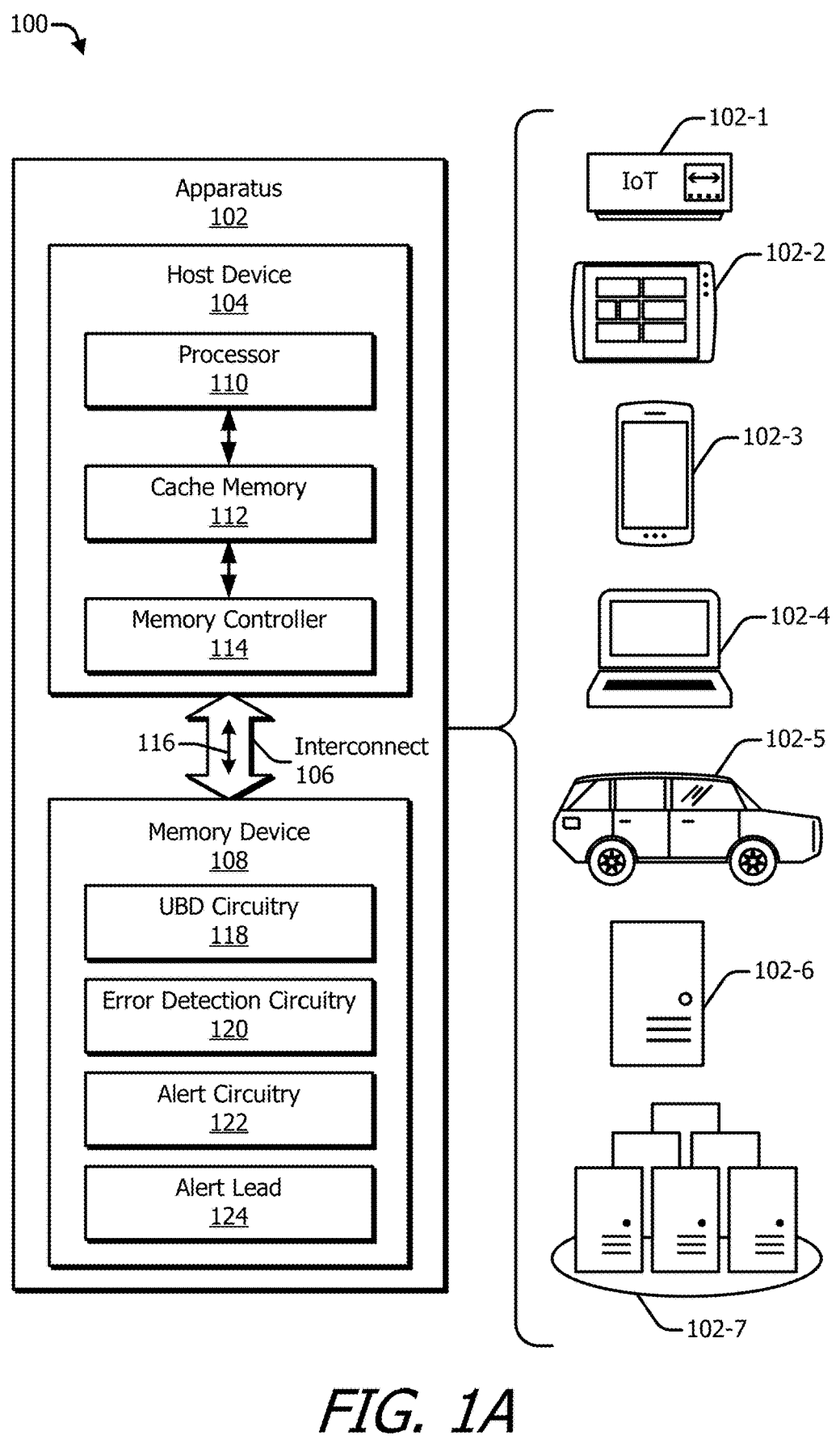

100

Apparatus
102

Host Device
104

Processor
110

Cache Memory
112

Memory Controller
114

116 — Interconnect
106

Memory Device
108

UBD Circuitry
118

Error Detection Circuitry
120

Alert Circuitry
122

Alert Lead
124

102-1

IoT 102-2

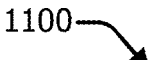
1100

TRANSMIT, ON A LEAD OF A DIE OF A MEMORY DEVICE, AN ALERT SIGNAL HAVING A FIRST PULSE INDICATING DETECTION OF A BANK-LEVEL ALERT EVENT ASSOCIATED WITH USAGE-BASED DISTURBANCE, THE FIRST PULSE HAVING A FIRST PULSE LENGTH
1102

TRANSMIT, ON THE LEAD, THE ALERT SIGNAL HAVING A SECOND PULSE INDICATING DETECTION OF AN ERROR EVENT THAT DIFFERS FROM THE BANK-LEVEL ALERT EVENT, THE SECOND PULSE HAVING A SECOND PULSE LENGTH THAT IS DIFFERENT THAN THE FIRST PULSE LENGTH
1104

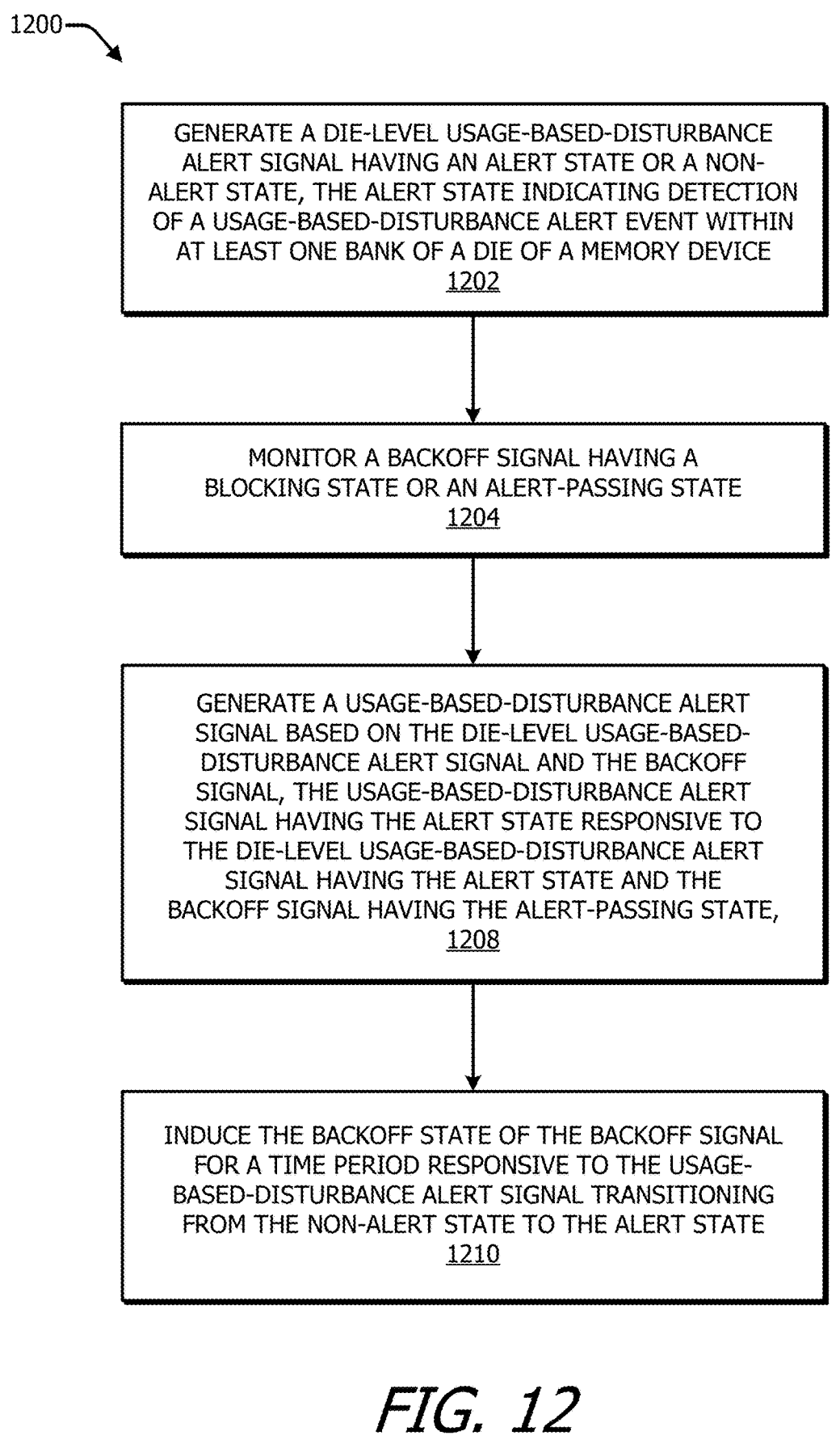

GENERATE A DIE-LEVEL USAGE-BASED-DISTURBANCE ALERT SIGNAL HAVING AN ALERT STATE OR A NON-ALERT STATE, THE ALERT STATE INDICATING DETECTION OF A USAGE-BASED-DISTURBANCE ALERT EVENT WITHIN AT LEAST ONE BANK OF A DIE OF A MEMORY DEVICE
1202

MONITOR A BACKOFF SIGNAL HAVING A BLOCKING STATE OR AN ALERT-PASSING STATE
1204

GENERATE A USAGE-BASED-DISTURBANCE ALERT SIGNAL BASED ON THE DIE-LEVEL USAGE-BASED-DISTURBANCE ALERT SIGNAL AND THE BACKOFF SIGNAL, THE USAGE-BASED-DISTURBANCE ALERT SIGNAL HAVING THE ALERT STATE RESPONSIVE TO THE DIE-LEVEL USAGE-BASED-DISTURBANCE ALERT SIGNAL HAVING THE ALERT STATE AND THE BACKOFF SIGNAL HAVING THE ALERT-PASSING STATE,
1208

INDUCE THE BACKOFF STATE OF THE BACKOFF SIGNAL FOR A TIME PERIOD RESPONSIVE TO THE USAGE-BASED-DISTURBANCE ALERT SIGNAL TRANSITIONING FROM THE NON-ALERT STATE TO THE ALERT STATE
1210

*FIG. 12*

USAGE-BASED-DISTURBANCE ALERT SIGNALING

CROSS-REFERENCE TO RELATED APPLICATION(S)

This application claims the benefit of U.S. Provisional Patent Application Ser. No. 63/583,477, filed on Sep. 18, 2023, the disclosure of which is incorporated by reference herein in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for implementing usage-based-disturbance alert signaling are described with reference to the following drawings. The same numbers are used throughout the drawings to reference like features and components:

FIG. 1A illustrates example apparatuses that can implement aspects of usage-based-disturbance (UBD) alert signaling;

FIG. 11 illustrates a second example method for implementing aspects of UBD alert signaling; and FIG. 12 illustrates a third example method for implementing aspects of UBD alert signaling.

DETAILED DESCRIPTION

Overview

Figure 1B:
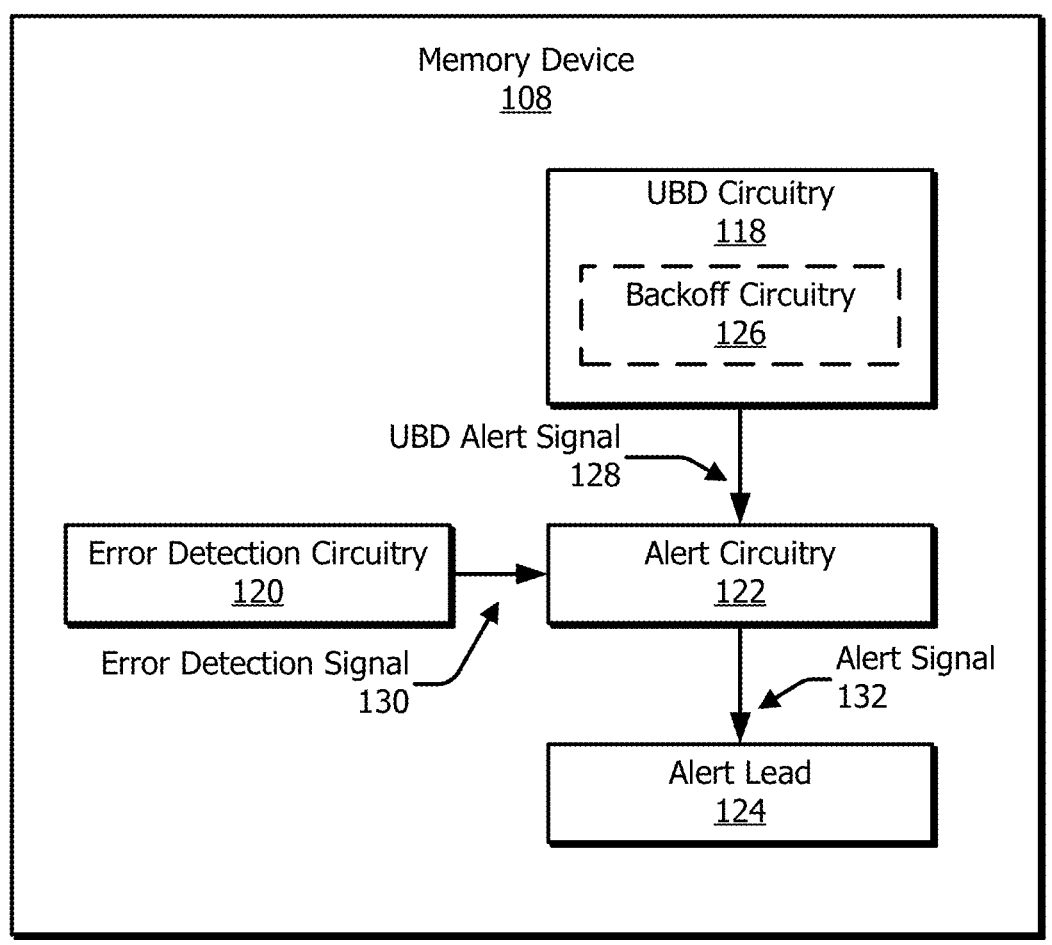
FIG. 1B illustrates an example operation of a memory device in performing aspects of UBD alert signaling.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification. However, in some implementations, more-reliable memories can sacrifice bit densities, power efficiency, and simplicity.

To meet the demands for physically smaller memories, memory devices can be designed with higher chip densities. Increasing chip density, however, can increase the electromagnetic coupling (e.g., capacitive coupling) between adjacent or proximate rows of memory cells due, at least in part, to a shrinking distance between these rows. With this undesired coupling, activation (or charging) of a first row of memory cells can sometimes negatively impact a second nearby row of memory cells. In particular, activation of the first row can generate interference, or crosstalk, that causes the second row to experience a voltage fluctuation. In some instances, this voltage fluctuation can cause a state (or value) of a memory cell in the second row to be incorrectly determined by a sense amplifier. Consider an example in which a state of a memory cell in the second row is a "1". In this example, the voltage fluctuation can cause a sense amplifier to incorrectly determine the state of the memory cell to be a "0" instead of a "1". Left unchecked, this interference can lead to memory errors or data loss within the memory device.

In some circumstances, a particular row of memory cells is activated repeatedly in an unintentional or intentional (sometimes malicious) manner. Consider, for instance, that memory cells in an $R^{th}$ row are subjected to repeated activation, which causes one or more memory cells in an adjacent row (e.g., within an R+1 row, an R+2 row, an R-1 row, and/or an R-2 row) to change states. This effect is referred to as a usage-based disturbance (UBD). The occurrence of UBD can lead to the corruption or changing of contents within the affected row of memory.

Some memory devices utilize circuits that can detect UBD and mitigate its effects. These circuits, however, can add complexity and cost to a memory device. Additionally, these circuits can increase an overall footprint and power consumption of the memory device, which can make it challenging to integrate within space-constrained devices, including portable devices.

To address this and other issues regarding UBD, this document describes aspects of UBD alert signaling. Such technology allows UBD alerts to be externally communicated from a memory device without a dedicated external interface. Rather, UBD alerts are combined with memory error signals and communicated on a shared alert-related interface. UBD detection and mitigation occurs at a memory bank level, with corresponding independent UBD alert signals. These signals are efficiently combined to generate a die-level UBD alert. In some implementations, additional backoff logic ensures requisite external timing parameters are met at the external interface while allowing individual memory banks to generate persistent UBD alerts.

Example Operating Environments

FIG. 1A illustrates, at 100 generally, an example operating environment including an apparatus 102 that can implement UBD alert signaling. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, gaming device), desktop computer, motherboard, server blade, consumer appliance, vehicle, drone, industrial equipment, security device, or sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to memory requests received from the external memory.

The memory controller 114 may also receive alert signals from the memory device 108 via the interconnect 106. For example, the alert signals may indicate that the memory device 108 has detected a UBD condition and/or a memory request error, such as a cyclic redundancy check (CRC) error in read or written data. The memory controller 114 may pass such alerts to the processor 110 or may handle such alerts directly.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than a main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1A an example computing system architecture having at least one host device 104 coupled to a memory device 108.

Two or more memory components (e.g., modules, dies, banks, or bank groups) can share electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, 3D stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes UBD circuitry 118, error detection circuitry 120, alert circuitry 122, and alert lead 124, which can be implemented as part of the interconnect 106. The UBD circuitry 118, the error detection circuitry 120, and the alert circuitry 122 can be implemented using software, firmware, hardware, fixed logic circuitry, or combinations thereof. These circuitries and the alert lead 124 enable the memory device 108 to report different types of alerts to the memory controller 114.

Throughout this disclosure, the term "alert" and "error" are both used to generally represent detection of an undesired event or condition. For explanation purposes, the term "alert" is used to indicate an event associated with UBD mitigation, and the term "error" is used to indicate an event associated with other non-UBD-related operations of the memory device 108 (e.g., operations not associated with UBD mitigation).

The UBD circuitry 118 mitigates UBD for one or more banks associated with the memory device 108. The UBD circuitry 118 can include at least one counter circuit for detecting UBD, at least one queue for managing refresh operations for mitigating the UBD, and/or at least one error-correction-code (ECC) circuit for detection and/or correcting bit errors associated with UBD. The UBD circuitry 118 also includes components for detecting and reporting an alert associated with UBD.

The error detection circuitry 120 detects another type of error that is not associated with UBD or the process of mitigating UBD. In some cases, this error is associated with normal data that is read from or written to the memory device 108. An example error can include a cyclic redundancy check (CRC) error in read or written data. In general, the error detected by the error detection circuitry 120 can indicate to the memory controller 114 that there is a problem with an operation of the memory device 108 that involves the normal data.

Instead of having separate leads for communicating different alerts from the UBD circuitry 118 and the error detection circuitry 120, the alert lead 124 handles both. The alert lead 124 may be a pad that is operatively in a high-voltage default state and that is placed into a low-voltage state to output signals that indicate an alert. Because the alert lead 124 is used to communicate multiple alerts reported by different components of the memory device 108, the alert lead 124 can be referred to as a constrained interface. Furthermore, because the alerts detected by these components can occur independent of each other, a conflict can arise when multiple alert/errors are reported during a same time interval.

To address this issue, the memory device 108 includes the alert circuitry 122, which manages communicating these alerts via the alert lead 124. The alert circuitry 122 acts as an interface between two or more alert-generating components (e.g., the UBD circuitry 118 and the error detection circuitry 120) and the alert lead 124. These circuitries are further described with respect to FIG. 1B.

FIG. 1B illustrates an example memory device 108. In the depicted configuration, outputs of the UBD circuitry 118 and the error detection circuitry 120 are coupled to different inputs of the alert circuitry 122. The alert lead 124 is coupled to an output of the alert circuitry 122. The UBD circuitry 118 includes components that are distributed at a bank level and a die level, as further described with respect to FIG. 3. The UBD circuitry 118 can optionally include backoff circuitry 126. The backoff circuitry 126 prevents subsequent generation of UBD alert signals 128 from impacting timing parameters associated with the alert lead 124.

During an operation of the memory device 108, the UBD circuitry 118 performs an array counter update procedure, which monitors how often a row of memory cells is activated. If an activation count of an activated row meets or exceeds a threshold, proximate rows, including one or more adjacent rows, may be at increased risk for data corruption due to the repeated activations of the accessed row and the usage-based-disturbance effect. To manage this risk to the affected rows, the UBD circuitry 118 adds this aggressor row to the queue and works through the queue to refresh one or more victim rows that are associated with the aggressor rows listed in the queue.

The UBD circuitry 118 can be designed to report one or more UBD-related alert events to the memory controller 114 via the alert circuitry 122 and the alert lead 124. A first example UBD-related alert event involves the UBD circuitry 118 determining that an activated row has an activation count that exceeds a first threshold. A second example UBD-related alert event involves the UBD circuitry 118 determining that a quantity of times that the activated row has exceeded the first threshold is greater than a second threshold. A third example UBD-related alert event involves the UBD circuitry 118 detecting a parity error associated with the activation count. A fourth example UBD-related alert event involves the UBD circuitry 118 determining that the queue is full. In general, the UBD circuitry 118 generates the UBD alert signal 128 to indicate detection of any type of event (or condition) associated with UBD or UBD mitigation. The UBD alert signal 128 can also be referred to as a die-level UBD alert signal, as further described with respect to FIGS. 4A-B.

The error detection circuitry 120 monitors for other errors associated with a normal operation of the memory device 108 (e.g., associated with read or write data). In some situations, the error detection circuitry 120 detects an error and communicates this error to the alert circuitry 122 using an error detection signal 130. The error detection circuitry 120 can perform various memory-related error detection techniques. For example, the error detection circuitry 120 may generate a CRC checksum for transmission with outgoing read data. The error detection circuitry 120 may check a received CRC checksum against incoming write data, in which case the error detection circuitry 120 may generate a CRC error detection signal upon a CRC failure. As another example, the error detection circuitry 120 may perform a parity check or other data-related error check and generate a corresponding error detection signal.

The alert circuitry 122 provides an alert signal 132 to the alert lead 124. The alert signal 132 is based on the UBD alert signal 128 generated by the UBD circuitry 118 and the error detection signal 130 generated by the error detection circuitry 120.

During a first time interval, the alert circuitry 122 outputs, via the alert lead 124, a first alert signal 132 based on the UBD alert signal 128. During a second time interval, the alert circuitry 122 outputs, via the alert lead 124, a second alert signal 132 based on the error detection signal 130 received from the error detection circuitry 120. During a third time interval, the alert circuitry 122 outputs, via the alert lead 124, a third alert signal 132 based on some combination of the UBD alert signal 128 and the error detection signal 130. In some examples, the first, second, and/or third alert signals 132 have different pulse lengths, where a first pulse length (i.e., of the first alert signal) is indicative of the UBD alert event, a second pulse length (i.e., of the second alert signal) is indicative of an error-associated event, and a third pulse length (i.e., of the third alert signal) is indicative of both the UBD alert signal 128 and the error detection signal 130. Different implementations of the alert circuitry 122 may treat concurrent reception of the UBD alert signal 128 and the error detection signal 130 in various manners. FIGS. 5A-D and 6A-D illustrate a combinatorial and a sequential example of the alert circuitry 122, respectively. The memory device 108 is further described with respect to FIG. 2.

Figure 2:
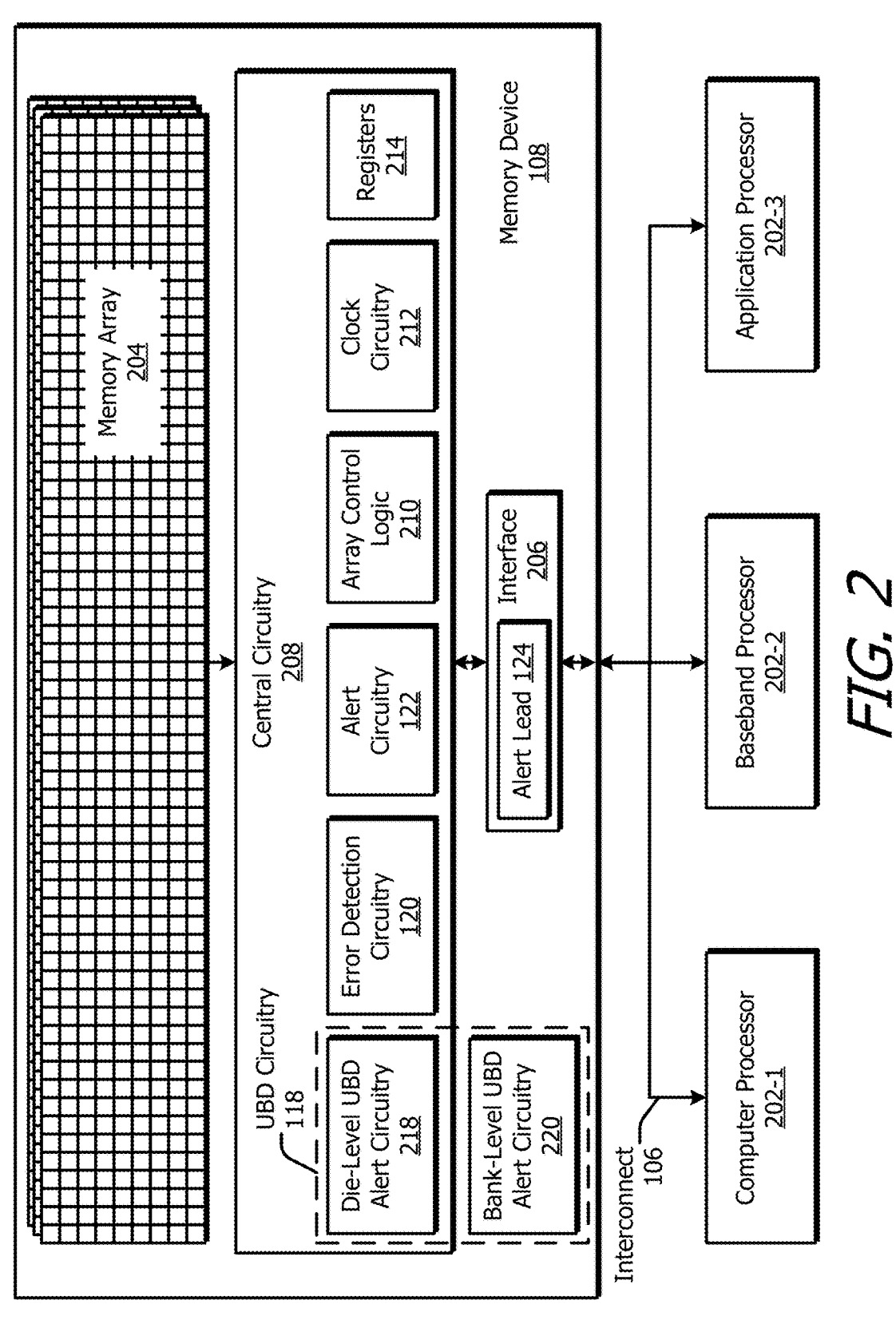
FIG. 2 illustrates an example computing system that can implement aspects of UBD alert signaling within a memory device.

FIG. 2 illustrates an example computing system 200 that can implement aspects of UBD alert signaling. In some implementations, the computing system 200 includes at least one memory device 108, at least one interconnect 106, and at least one processor 202. The memory device 108 can include, or be associated with, at least one memory array 204, at least one interface 206, and central circuitry 208 (or periphery circuitry) operatively coupled to the memory array 204. The memory array 204 can include an array of memory cells, including but not limited to memory cells of DRAM, SDRAM, 3D stacked DRAM, DDR memory, LPDDR SDRAM, and so forth. The memory array 204 may be organized in one or more bank-level groupings, such as banks, sub-banks, or bank groups. The memory array 204 and the central circuitry 208 may be components on a single semiconductor die or on separate semiconductor dies. The memory array 204 and/or the central circuitry 208 may also be distributed across multiple dies. The central circuitry 208 may manage traffic on a bus that is separate from the interconnect 106.

The central circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the central circuitry 208 can include at least one instance of array control logic 210, clock circuitry 212, registers 214, at least a portion of the UBD circuitry 118, the error detection circuitry 120 and the alert circuitry 122.

The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality. The registers 214 can store various configuration and status data. For example, the registers 214 may store timing parameters, configuration information activating or deactivating a certain functionality, or various status data.

The illustrated instance of the UBD circuitry 118 includes die-level UBD alert circuitry 218 and bank-level UBD alert circuitry 220. The bank-level UBD alert circuitry 220 detects alerts associated with mitigating UBD at a bank level. In contrast, the die-level UBD alert circuitry 218 detects an alert at a die level based on the alerts received from the bank-level UBD alert circuitry 220. The die-level UBD alert circuitry 218 can be implemented within the central circuitry 208. A further example of the UBD circuitry 118, including the die-level UBD alert circuitry 218 and the bank-level UBD alert circuitry 220, is described with respect to FIG. 3.

The central circuitry 208 also includes the error detection circuitry 120. In various implementations, The error detection circuitry 120 may store information regarding the error detection operation in a register of the registers 214. For example, the error detection circuitry 120 may set a flag bit at a predefined error status address in the registers 214 upon detection of an error.

Figure 3:
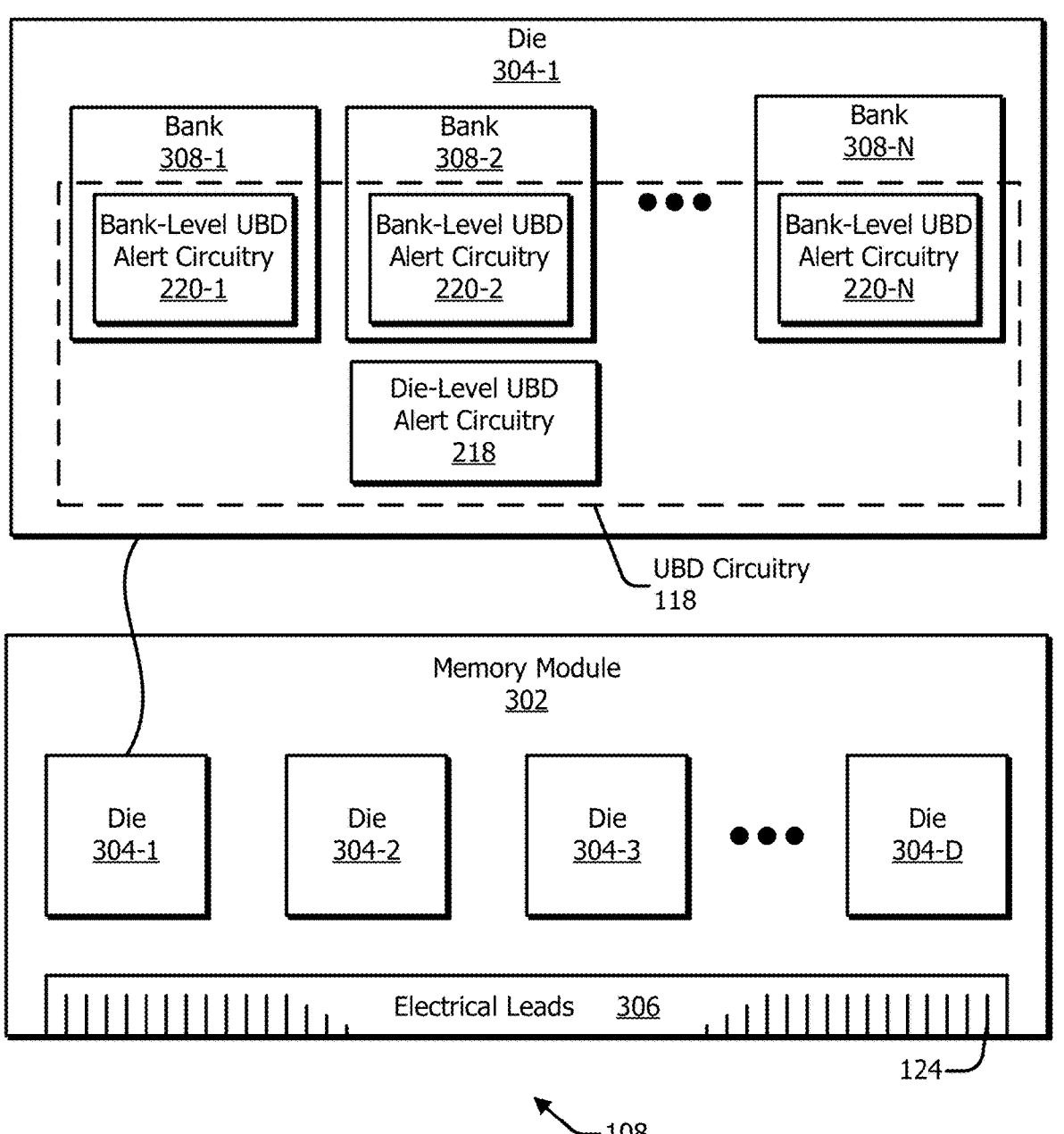
FIG. 3 illustrates an example memory device in which aspects of UBD alert signaling may be implemented.

The interface 206 can couple the central circuitry 208 or the memory array 204 directly or indirectly to the interconnect 106. In some implementations, the UBD circuitry 118, the error detection circuitry 120, the alert circuitry 122, the array control logic 210, and the clock circuitry 212 can be part of a single component (e.g., the central circuitry 208). In other implementations, one or more of the UBD circuitry 118, the error detection circuitry 120, the alert circuitry 122, the array control logic 210, or the clock circuitry 212 may be implemented as separate components, which can be provided on a single semiconductor die or disposed across multiple semiconductor dies. For example, FIG. 3 illustrates an example where the UBD circuitry 118 includes the die-level UBD alert circuitry 218 and the bank-level UBD alert circuitry 220. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus.

In some aspects, the memory device 108 may be a "separate" component relative to the host device 104 (of FIG. 1A) or any of the processors 202. The separate components can include a printed circuit board, memory card, memory stick, and memory module (e.g., a single in-line memory module (SIMM) or dual in-line memory module (DIMM)). Thus, separate physical components may be located together within a same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). The memory device 108, including the UBD circuitry 118, is further described with respect to FIG. 3.

Example Techniques and Hardware

FIG. 3 illustrates an example memory device 108 in which aspects of UBD alert signaling can be implemented. The memory device 108 includes a memory module 302, which can include multiple dies 304. As illustrated, the memory module 302 includes a first die 304-1, a second die 304-2, a third die 304-3, and a Dth die 304-D, with D representing a positive integer.

The memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1A and 2 can correspond, for example, to the multiple dies (or dice) 304-1 through 304-D, or the memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a printed circuit board, and the multiple dies 304-1 through 304-D may be mounted or otherwise attached to the printed circuit board. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302.

One or more of the dies 304-1 to 304-D can include the UBD circuitry 118. In this example, each die 304-1 to 304-D includes a plurality of N memory banks 308-1, 308-2, and 308-N (referred to as the banks 308, or a bank 308-i), with N representing a positive integer. Each bank 308-i comprises an independently addressable or accessible array of memory cells organized into rows. In various examples, each bank 308-i includes dedicated bank-level circuitry, such as sense amps, precharge circuits, column address circuitry, buffers, or routing circuitry. The banks 308-1 to 308-N further include corresponding instances of bank-level UBD alert circuitry 220-1, 220-2 . . . and 220-N (referred to as the circuitries 220, or a circuitry 220-i).

Each bank-level UBD alert circuitry 220-i detects occurrence of a UBD alert condition on its respective bank 308-i. In some implementations, each bank-level UBD alert circuitry 220-i generates a respective bank-level UBD alert signal in response to the detected UBD alert condition. For example, the bank-level UBD alert circuitries 220 may generate the respective bank-level UBD alert signals when the corresponding queue is full. Such a condition may be resolved by different actions or events that clear the bank-level UBD alert signal.

In some implementations, the bank-level UBD alert circuitry 220 may comprise circuitry shared between multiple banks 308, such as bank groups. In some implementations, the bank-level UBD alert circuitry 220 may comprise multiple instances within a given bank 308. For example, there may be an instance of the bank-level UBD alert circuitry 220-i for each sub-bank of each bank 308. The bank-level UBD alert circuitry 220 is communicatively coupled to the die-level UBD alert circuitry 218.

The die-level UBD alert circuitry 218 detects a die-level UBD condition responsive to a presence of a bank-level UBD condition. In some implementations, the die-level UBD alert circuitry 218 may generate a die-level UBD alert signal responsive to detecting the presence of the bank-level UBD condition. The die-level UBD alert circuitries 218 and the bank-level UBD alert circuitries 220 are further described with respect to FIGS. 4A and 4B.

Figure 4A:
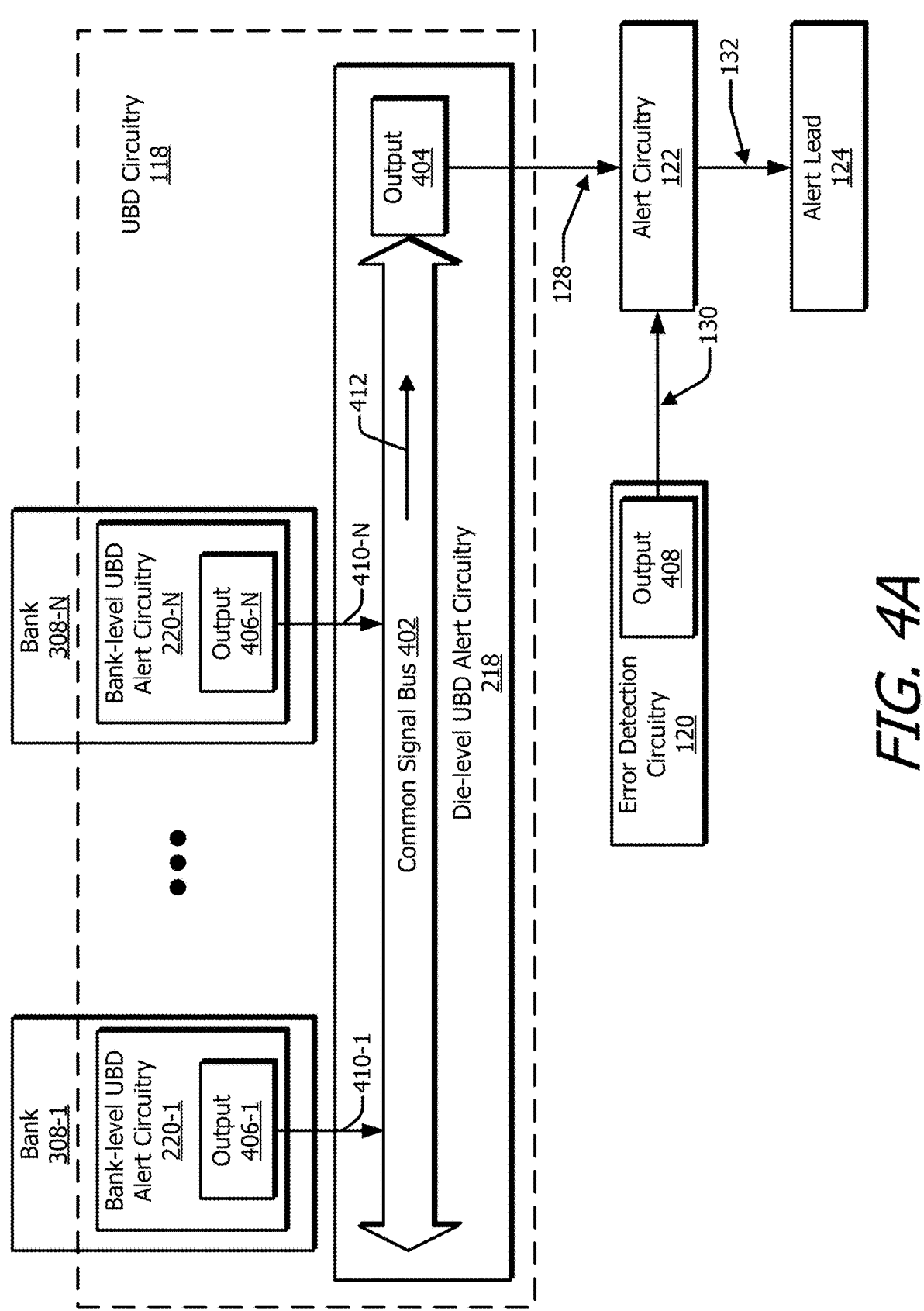
FIG. 4A illustrates example circuitry that may implement UBD alert signaling.

FIG. 4A illustrates example circuitry that implements aspects of UBD alert signaling. For example, the illustrated circuitry may be components of a memory model, such as the memory module 302 described with respect to FIG. 3. The example circuitry includes the banks 308-1 to 308-N, the UBD circuitry 118, the error detection circuitry 120, the alert circuitry 122, and the alert lead 124. The UBD circuitry 118 includes the die-level UBD alert circuitry 218 and the bank-level UBD alert circuitry 220-1 to 220-N.

In the depicted configuration, the die-level UBD alert circuitry 218 includes a common signal bus 402 and an output 404. The die-level UBD alert circuitry 218 can include driver circuitry to drive the voltage of the common signal bus 402. The bank-level UBD alert circuitries 220-1 to 220-N include respective outputs 406-1 to 406-N (collectively, the bank-level UBD alert circuitry 220 having outputs 406; individually, bank-level UBD alert circuitry 220-i having output 406-i). The error detection circuitry 120 includes an output 408.

The common signal bus 402 couples the outputs 406-1 to 406-N of the bank-level UBD alert circuitries 220 to the output 404 of the die-level UBD alert circuitry 218. In some implementations, the common signal bus 402 may be tied to a ground, and each output 406-i includes circuitry that may drive the common signal bus 402 to a signal voltage. Other implementations are also possible in which the die-level UBD alert circuitry 218 is implemented as a multiplexer and directly couples the outputs 406 of the bank-level UBD alert circuitries 220 to the input of the alert circuitry 122.

As illustrated, the alert circuitry 122 is coupled to the output 404 of the die-level UBD alert circuitry 218, the output 408 of the error detection circuitry 120, and the alert lead 124. As discussed above, different circuitry implementations of the alert circuitry 122 may combine the UBD alert signal 128 and the error detection signal 130 to generate the alert signal 132 in different manners.

During operation, each bank-level UBD alert circuitry 220-i can detect a UBD alert event within its respective bank 308-i and generates a respective bank-level UBD alert signal 410-1 to 410-N (referred to as the bank-level UBD alert signals 410, or a bank-level UBD alert signal 410-i). The bank-level UBD alert signal 410-i (or more specifically a state of the bank-level UBD alert signal 410-i) can indicate the detection of the UBD alert event. The UBD alert events detected by the bank-level UBD alert circuitries 220 are independent from each other. As such, any two of the bank-level UBD alert circuitries 220 can detect UBD alert events at different time intervals or during a same time interval.

The die-level UBD alert circuitry 218 generates a die-level UBD alert signal 412 based on the bank-level UBD alert signals 410. In this example, the die-level UBD alert signal 412 represents a combination (e.g., a logical OR) or summation of the bank-level UBD alert signals 410. In general, the die-level UBD alert signal 412 indicates detection of a UBD alert event within at least one of the banks 308 to which the die-level UBD alert circuitry 218 is connected. The die-level UBD alert circuitry 218 outputs the die-level UBD alert signal 412 as the UBD alert signal 128.

Further, the die-level UBD alert signal 412 may meet various constraints or characteristics. For example, the die-level UBD alert signal 412 may be synchronized to a clock signal, have a length indicative of a type of alert event, or meet various timing parameters, such as maximum alert signal lengths or alert backoff timing requirements. A further example of the die-level UBD alert circuitry 218 is discussed with respect to FIG. 7. Example states of the bank-level UBD alert signals 410 and the die-level UBD alert signal 412 are further described with respect to FIG. 4B.

Figure 4B:
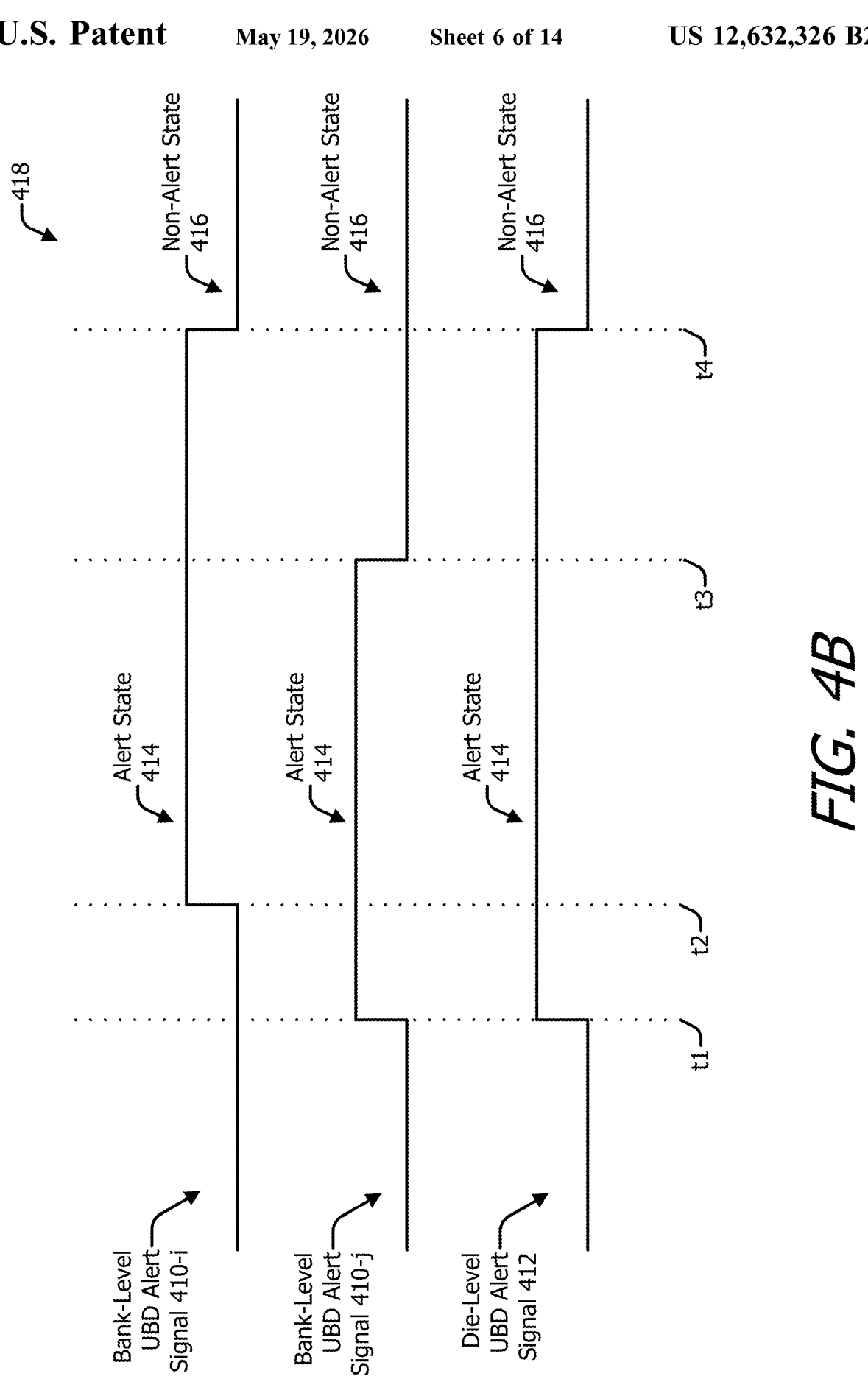
FIG. 4B illustrates example bank-level UBD alert signals and an example die-level UBD alert signal.

FIG. 4B illustrates example bank-level UBD alert signals 410-i and 410-j and a die-level UBD alert signal 412. In this example, the bank-level UBD alert signals 410-i and 410-j and the die-level UBD alert signal 412 can have a voltage representative of an alert state 414 or a non-alert state 416, which can also be referred to as a default state. The alert state 414 and the non-alert state 416 can represent different aspects of UBD alert signaling, as further described below.

In an example implementation, the alert state 414 of the bank-level UBD alert signals 410-i or 410-j indicates that an alert event is detected by the corresponding bank-level UBD alert circuitry 220-i or 220-j. In contrast, the non-alert state 416 of the bank-level UBD alert signals 410-i or 410-j indicates that an alert event is not detected by the corresponding bank-level UBD alert circuitry 220-i or 220-j.

The alert state 414 of the die-level UBD alert signal 412 indicates that at least one of the bank-level UBD alert signals 410-i and 410-j is in the alert state 414. The non-alert state 416 of the die-level UBD alert signal 412 indicates that all of the bank-level UBD alert signals 410-i and 410-j are in the non-alert state 416.

In the example shown in FIG. 4B, the alert state 414 represents a high voltage (e.g., a supply voltage), and the non-alert state 416 represents a low voltage (e.g., a ground). Other examples might utilize other voltage states for signaling, such as a low voltage indicating the alert state 414 and a high voltage indicating a non-alert state 416, or may utilize other signaling techniques.

Consider the example signals shown at 418. Prior to time t1, the bank-level UBD alert circuitries 220-i and 220-j do not detect a UBD alert event. As such, the bank-level UBD alert circuitries 220-i and 220-j generate bank-level UBD alert signals 410-i and 410-j with the non-alert state 416. The die-level UBD alert signal 412 is also in the non-alert state 416 based on the bank-level UBD alert signals 410-i and 410-j being in the non-alert state 416.

At time t1, the bank-level UBD alert circuitry 220-j detects a UBD alert event and generates the bank-level UBD alert signal 410-j with the alert state 414. Explained another way, the output 406-j of the bank-level UBD alert circuitry 220-j induces the alert state 414 at time t1. The bank-level UBD alert circuitry 220-i does not detect a UBD alert event. As such, the bank-level UBD alert signal 410-i remains at the non-alert state 416. Because the bank-level UBD alert signal 410-j is at the alert state 414, the state of the die-level UBD alert signal 412 changes from the non-alert state 416 to the alert state 414.

At time t2, the bank-level UBD alert circuitry 220-i detects a UBD alert event and generates the bank-level UBD alert signal 410-i with the alert state 414. Explained another way, the output 406-i of the bank-level UBD alert circuitry 220-i induces the alert state 414 at time t2. The die-level UBD alert signal 412 remains at the alert state 414.

At time t3, the UBD alert event detected by the bank-level UBD alert circuitry 220-j is cleared. As such, the bank-level UBD alert circuitry 220-j generates the bank-level UBD alert signal 410-j with the non-alert state 416. Explained another way, the bank-level UBD alert circuitry 220-j ceases inducing the alert state 414, allowing its output 406-i to return to the non-alert state 416. Because the bank-level UBD alert signal 410-i is still in the alert state 414, the die-level UBD alert signal 412 remains in the alert state 414.

The alert circuitry 122 can be implemented in a variety of different ways to pass the information provided by the die-level UBD alert signal 412 to the alert lead 124. FIGS. 5A-D and 6A-D illustrate a combinatorial example and a sequential example of the alert circuitry 122, respectively.

Figures 5A, 5B, 5C, 5D:
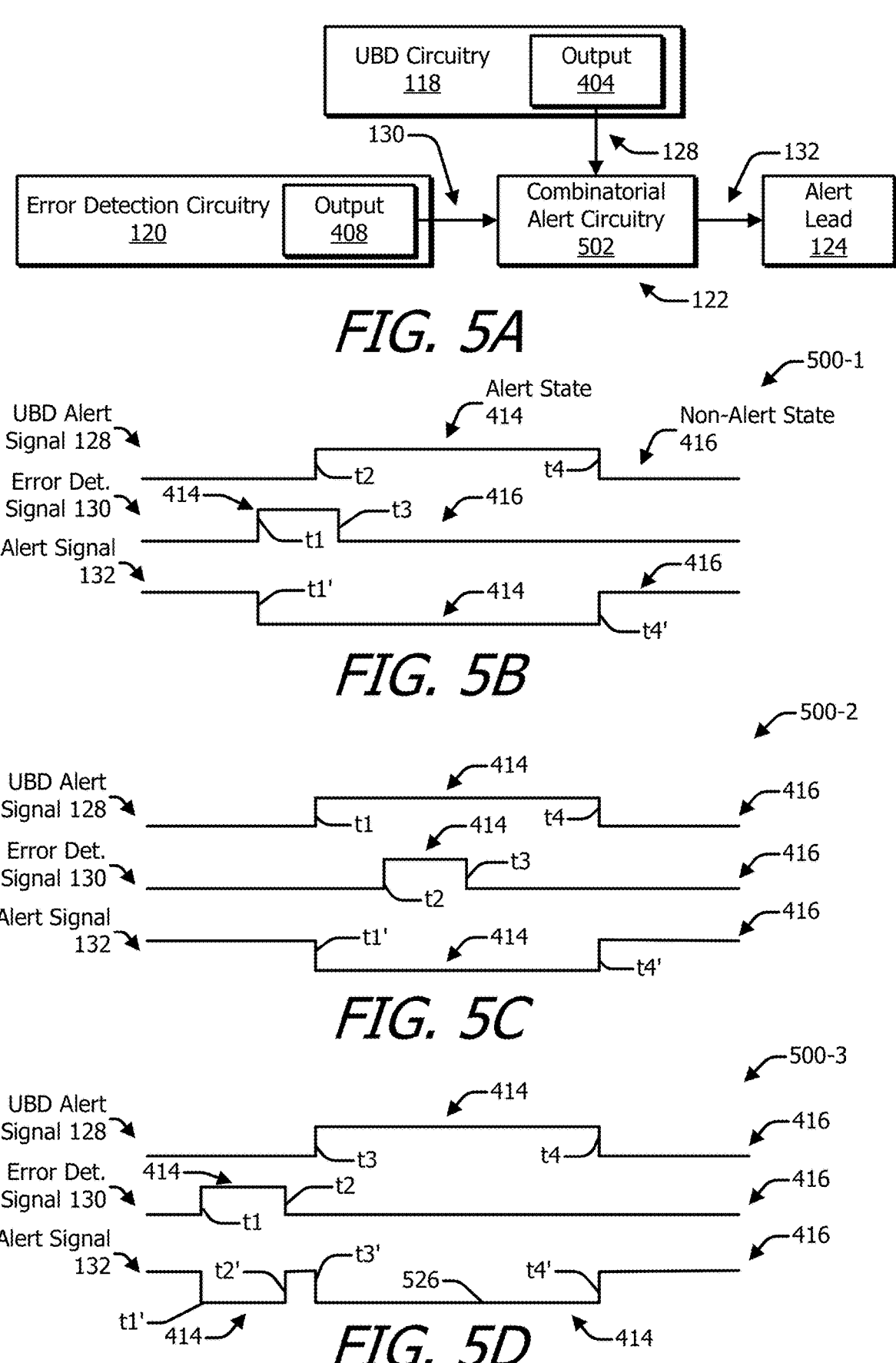
FIG. 5A illustrates example circuitry for UBD alert signaling including an instance of alert circuitry comprising combinatorial alert circuitry.
FIGS. 5B-5D illustrate examples of input and output signals for the combinatorial alert circuitry in various timing scenarios.

FIG. 5A illustrates example circuitry for UBD alert signaling including an instance of the alert circuitry 122 implemented as combinatorial alert circuitry 502. FIGS. 5B-5D illustrate examples of input and output signals for the combinatorial alert circuitry 502 in various timing scenarios 500-1, 500-2, and 500-3, respectively. As illustrated in FIG. 5A, the combinatorial alert circuitry 502 is coupled to the output 404 of the UBD circuitry 118 and the output 408 of the error detection circuitry 120. The combinatorial alert circuitry 502 receives the UBD alert signal 128 from the UBD circuitry 118 and receives the error detection signal 130 from the error detection circuitry 120. In some cases, the combinatorial alert circuitry 502 receives the UBD alert signal 128 by monitoring the voltage at the output 404, for example, via a signal line connecting the output 404 to the combinatorial alert circuitry 502. In some implementations, the UBD alert signal 128 represents the die-level UBD alert signal 412 as described with respect to FIGS. 4A-B. The combinatorial alert circuitry 502 can also receive the error detection signal 130 by monitoring the voltage at the output 408, for example, via a signal line connecting the output 408 to the combinatorial alert circuitry 502.

The UBD alert signal 128, the error detection signal 130, and the alert signal 132 can be voltage-modulated signals having different voltages to indicate the alert state 414 and the non-alert state 416 (e.g., the default state). The UBD alert signal 128 and the error detections signal, for instance, can indicate the alert state 414 using a high voltage (e.g., a supply voltage) and indicate the non-alert state 416 state using a low voltage (e.g., a ground voltage). In other implementations, the voltage states may be reversed, with a low voltage indicating the alert state 414. The alert state 414 for the UBD alert signal 128 can be referred to as a UBD alert state while the alert state 414 for the error detection signal 130 can be referred to as an error detected state.

In the example instances, a pulse length and timing of the alert state 414 within the UBD alert signal 128 (e.g., the pulse lengths are equal to t4–t2 at 500-1, t4–t1 at 500-2, and t4–t3 at 500-3) are controlled by the UBD circuitry 118. The UBD circuitry 118 can establish the pulse length and synchronize the UBD alert signal 128 to an internal clock signal provided by clock circuitry 212. An example of such UBD circuitry 118 is further described with respect to FIG. 7. Similarly to the UBD circuitry 118, the error detection circuitry 120 establishes the pulse length and timing of the alert state 414 within the error detection signal 130.

The combinatorial alert circuitry 502 combines the UBD alert signal 128 and the error detection signal 130 to generate the alert signal 132. The combinatorial alert circuitry 502 may comprise one or more logic gates configured to generate the alert signal 132. The combinatorial alert circuitry 502 may comprise other circuitry configured to perform further operations to generate the alert signal 132. In this example, the combinatorial alert circuitry 502 includes logic gates configured to perform a digital 'NOR' operation on the received signals 128 and 132. The combinatorial alert circuitry 502 also includes inversion circuitry to cause the alert signal 132 to have a low voltage (e.g., a ground voltage) to indicate the alert state 414 and a high voltage (e.g., a supply voltage) to indicate the non-alert state 416.

The alert lead 124 can be at a high voltage during normal operation in the absence of any alert. For example, the alert lead 124 may comprise circuitry, such as a pull up resistor, tying a voltage on the alert lead 124 to a supply voltage during normal operation. The combinatorial alert circuitry 502 comprises circuitry, such as driver circuitry, to induce the alert state 414 at the alert lead 124. For example, the combinatorial alert circuitry 502 may comprise driver circuitry to drive the alert lead 124 to the ground voltage to induce the alert state 414. Example timing and states of the UBD alert signal 128, the error detection signal 130, and the alert signal 132, as generated by the combinatorial alert circuitry 502, are further described with respect to FIGS. 5B-D.

FIG. 5B illustrates a first example timing diagram 500-1 where the alert states 414 of the UBD alert signal 128 and the error detection signal 130 partially overlap during a common time interval. As illustrated, the error detection signal 130 is received with a pulse from time t1 until t3, and the UBD alert signal 128 is received with a pulse from time t2 until t4. The pulses within the UBD alert signal 128 and the error detection signal 130 represent a period of time in which the UBD circuitry 118 and the error detection circuitry 120 detect an alert/error event and are communicating the alert state 414.

In this example, the pulse length of the error detection signal 130 partially overlaps with the pulse length of the UBD alert signal 128 during the common time interval from t2 until t3. The combinatorial alert circuitry 502 generates, based on the error detection signal 130 and the UBD alert signal 128, the alert signal 132 having the alert state 414 from t1' until t4', where the apostrophe indicates the output time may be the same as the input time (i.e., within the same clock cycle) or may be delayed from the input time (e.g., by a number of clock cycles or nanoseconds). The alert signal 132 has a pulse length equal to the non-overlapping alert states 414 plus the overlapping alert states 414 (i.e., the pulse length=(t2–t1)+ (t3–t2)+ (t4–t3)) of the UBD alert signal 128 and the error detection signal 130. The resulting alert signal 132 is in the alert state 414 for a longer period of time than either of the input signals 128 or 130.

In some examples, such as an implementation in which both the UBD alert signals 128 and the error detection signals 130 have fixed pulse lengths, the longer pulse length of the alert signal 132 may indicate a presence of both a UBD-related alert event and an error-related event. In other examples, such as an implementation where the pulse length of the UBD alert signal 128 indicates a count of UBD-related alert events, the longer pulse length may indicate the presence of at least one UBD-related alert event and a possible error-related event. In this case, a component monitoring the alert lead 124, such as the memory controller 114, may interact further with a memory device 108 to determine which alerts are present. For example, the memory controller 114 may read the register 214 storing an error-detection status to determine whether or not the memory device 108 is undergoing an error-related event.

FIG. 5C illustrates a second example timing diagram 500-2 where the alert states 414 of the UBD alert signal 128 and the error detection signal 130 completely overlap during a common time interval. As illustrated, the UBD alert signal 128 is in the alert state 414 from time t1 until time 14. The error detection signal 130 is in the alert state 414 from time t2 until time t3, where t1<t2 and t3<t4. As such, the pulse of the error detection signal 130 is completely overlapped by the pulse of the UBD alert signal 128. The resulting alert signal 132 is in the alert state 414 from t1' until t4' and has a pulse length equal to that of the UBD alert signal 128. In this case, the error detection signal 130 is masked by the UBD alert signal 128. Accordingly, the alert signal 132 is indicative of a UBD-related alert event and a possible error-related event. As discussed above, the memory controller 114 may communicate further with the memory device 108 to determine if there is an error-related event in addition to the UBD-related alert event.

FIG. 5D illustrates a third example timing diagram 500-3 where the alert states 414 of the UBD alert signal 128 and the error detection signal 130 occur during non-overlapping time intervals. When the UBD alert signal 128 and the error detection signal 130 are sequentially in the alert state 414 in a sequential manner, the combinatorial alert circuitry 502 generates the alert signal 132 having the alert state 414 in the same sequence. In the illustrated example, the error detection signal 130 is in the alert state 414 from time t1 until time t2. Later, the UBD alert signal 128 is in the alert state 414 from time t3 until time t4. The resulting alert signal 132 includes a first pulse based on the pulse of the error detection signal 130 and a second pulse based on the pulse of the UBD alert signal 128. Similarly, if the UBD alert signal 128 were received before the error detection signal 130 and without overlap, the alert signal 128 has a first pulse based on the pulse of the UBD alert signal 128 and a second pulse based on the pulse of the error detection signal 130.

In some examples, a period of inactivity between the first and second pulses of the alert signal 132 may provide an indication of multiple alert conditions without requiring the memory controller 114 to evaluate the register 214. In other examples, the time between the first and second pulses of the alert signal 132 may be too short and cause a glitch. While the combinatorial alert circuitry 502 can be relatively simple to implement, the ambiguity in the alert signal 132 in examples 500-1 and 500-2, and the possible glitch in example 500-3, can be resolved using another type of implementation as further described with respect to FIGS. 6A-D.

Figures 6A, 6B, 6C, 6D:
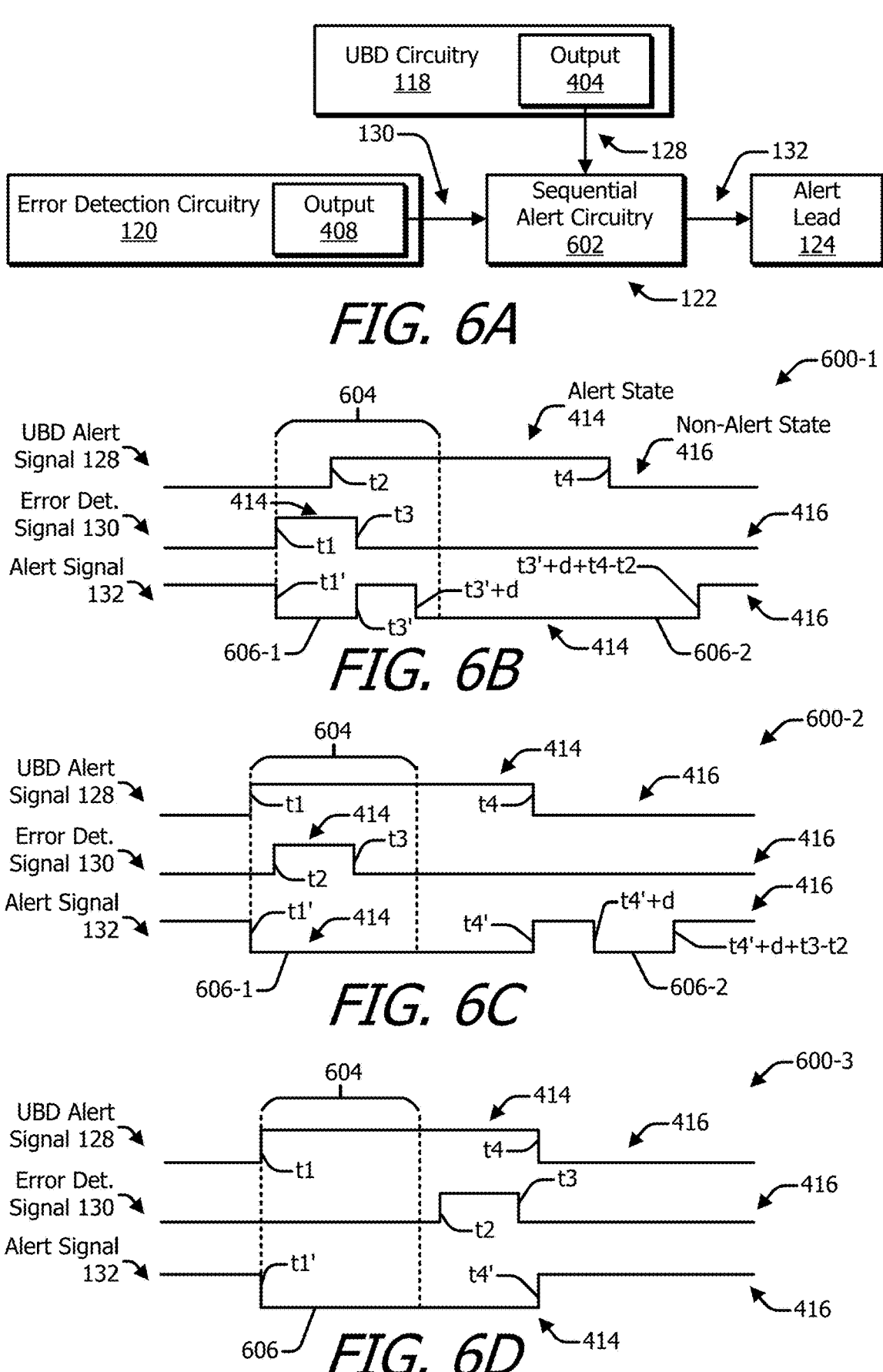
FIG. 6A illustrates example circuitry for UBD alert signaling including an instance of alert circuitry comprising sequential alert circuitry.
FIGS. 6B-6D illustrate examples of input and output signals for the sequential alert circuitry in various timing scenarios.

FIG. 6A illustrates example circuitry for UBD alert signaling including an instance of alert circuitry 122 implemented as sequential alert circuitry 602. FIGS. 6B-6D illustrate examples of input and output signals for the sequential alert circuitry 602 in various timing scenarios 600-1, 600-2, and 600-3. In contrast to the combinatorial alert circuitry 502 of FIG. 5A, the sequential alert circuitry 602 of FIG. 6A has additional logic to arbitrate conflicts and reduce a probability of glitches. For example, the sequential alert circuitry 602 can include delay circuitry that ensures that alerts/errors that are indicated during an overlapping time interval are reported in a sequential manner with a period of inactivity between the reports. More specifically, the sequential alert circuitry 602 outputs multiple signal pulses indicating detection of multiple alert/error events and separates these pulses by a period of inactivity to avoid a glitch. Accordingly, when both the UBD alert signal 128 and the error detection signal 130 are in the alert state 414 during a common time interval, the alert signal 132 provides an indication of both alert states 414 during different time intervals.

As illustrated in FIG. 6A, the sequential alert circuitry 602 is coupled to the output 404 of the UBD circuitry 118 and the output 408 of the error detection circuitry 120. The sequential alert circuitry 602 can receive the UBD alert signal 128 from the UBD circuitry 118 and receive the error detection signal 130 from the error detection circuitry 120 in a similar manner as described with respect to the combinatorial alert circuitry 502 of FIG. 5A. The UBD alert signal 128 and the error detection signal 130 depicted in FIGS. 6A-D can have the same states as described with respect to FIGS. 5A-D.

The sequential alert circuitry 602 combines the UBD alert signal 128 and the error detection signal 130 to generate the alert signal 132. The sequential alert circuitry 602 may include circuitry, such as logic gates, buffers, delay circuitry, or edge-triggered flip-flops. The sequential alert circuitry 602 is configured to output a sequence of signal pulses based on receiving multiple errors/alerts during an arbitration time period 604. The arbitration time period 604 defines a period of time in which the UBD alert signal 128 and the error detection signal 130 may be in the alert state 414 and the alert signal 132 can be generated with multiple output pulses. Signals received simultaneously outside of the arbitration time period 604 may be masked.

In some implementations, the arbitration time period 604 and/or the delay period d may be programmable parameters, such as parameters stored in the registers 214 and programmable by the memory controller 114. For example, the arbitration time period 604 may be defined as twice the pulse length of the error detection signal 130. In other implementations, these parameters may be predefined.

Other timing parameters may be set to accommodate sequential pulse transmission. For example, the memory device 108 may have a parameterized timing setting that defines a maximum allowable time (e.g., t_CRC) in which to send the error detection signal 130 after an error is detected. In this example, t_CRC may include the arbitration time period 604, the delay period d, and the time period used to perform the error detection. In some implementations, the UBD alert signal 128 may have similar timing requirements that may be set to include a potential delay caused by a preceding error/alert signal.

The sequential alert circuitry 602 may perform other operations on incoming signals to generate the outgoing signals. In an example implementation, the sequential alert circuitry 602 includes inversion circuitry, which causes the resulting alert signal 132 to have a low voltage (e.g., a ground voltage) to indicate the alert state 414 and a high voltage to indicate the non-alert state 416. The alert lead 124 can be at the high voltage during normal operation in the absence of any alert. For example, the alert lead 124 may comprise circuitry, such as a pull up resistor, tying the voltage on the alert lead 124 to a supply voltage during normal operation. The sequential alert circuitry 602 comprises circuitry, such as driver circuitry, to induce the alert state 414 at the alert lead 124. For example, the sequential alert circuitry 602 may comprise driver circuitry to drive the alert lead 124 to the ground voltage to induce the alert state 414. Example timing and states of the UBD alert signal 128, the error detection signal 130, and the alert signal 132, as generated by the sequential alert circuitry 602, are further described with respect to FIGS. 6B-D.

FIG. 6B illustrates a first example timing diagram 600-1, which has a similar input signal timing as FIG. 5B at 500-1. In FIG. 6B, the UBD alert signal 128 and the error detection signal 130 are in the alert state 414 within the arbitration time period 604 in a partially overlapping manner. As illustrated, the arbitration time period 604 is defined to be shorter than the pulse length of the UBD alert signal 128. The sequential alert circuitry 602 generates the alert signal 132 having two signal pulses 606-1 and 606-2 separated by a delay period d. The two signal pulses 606-1 and 606-2 represent two instances in which the alert signal 132 is in the alert state 414. This differs from the alert signal 132 generated by the combinatorial alert circuitry 502 at 500-1, which includes a single pulse.

To further explain, the UBD alert signal 128 has a pulse that indicates the alert state 414 from time t2 until t4, and the error detection signal 130 has a pulse that indicates the alert state 414 from time t1 until t3. In this example, a portion of the pulses of the UBD alert signal 128 and the error detection signal 130 are received concurrently such that the pulse length of the error detection signal 130 overlaps with the pulse length of the UBD alert signal 128 during a common time interval from t2 until t3. The resulting alert signal 132 includes the first pulse 606-1 from t1' until t3', and the second pulse 606-2 from t3'+d until t3'+d+ (t4−t2). In other words, the second pulse 606-2 starts the delay time d after the end of the first pulse 606-1 and lasts for the pulse length of the UBD alert signal 128. The apostrophe indicates the output time may be the same as the input time (i.e., within the same clock cycle) or may be delayed from the input time (e.g., by a number of clock cycles or nanoseconds). With the two separate pulses 606-1 and 606-2, the alert signal 132 can indicate, to the memory controller 114, occurrence of a UBD-related alert event and an error-related event. Furthermore, because the second pulse 606-2 is delayed by a sufficient amount from the first pulse 606-1, the sequential alert circuitry 602 reduces a probability of a glitch occurring.

FIG. 6C illustrates a second example timing diagram 600-2, which has a similar signal input timing as FIG. 5C at 500-2. In FIG. 6C, the UBD alert signal 128 and the error detection signal 130 are in the alert state 414 within the arbitration time period 604 in a completely overlapping manner. In contrast to the combinatorial alert circuitry 502 masking one signal within the other, as shown in FIG. 5C at 500-2, the sequential alert circuitry 602 outputs the two signal pulses 606-1 and 606-2 separated by the delay time d. Accordingly, the memory controller 114 receiving the alert signal 132 can recognize the occurrence of both alert conditions without reading the register 214.

As illustrated, the UBD alert signal 128 is in the alert state 414 at time t1 and until time t4. The error detection signal 130 is in the alert state 414 within the arbitration time period 604 at time t2 until time t3, where t1<t2 and t3<t4 such that the alert state 414 of the error detection signal 130 is completely overlapped in time by the alert state 414 of the UBD alert signal 128. The resulting alert signal 132 includes the pulse 606-1 from t1' until t4' and the pulse 606-2 from t4'+d until t4'+d+ (t3–t2). In this manner, the pulse 606-2 starts the delay time d after the end of the pulse 606-1 and lasts for the pulse length of the error detection signal 130. Accordingly, the alert signal 132 is indicative of a UBD-related alert event and an error-related event.

FIG. 6D illustrates a third example timing diagram 600-3. The UBD alert signal 128 and the error detection signal 130 are in the alert state 414 during a common time interval that is outside of the arbitration time period 604. In this case, the alert state 414 of the error detection signal 130 is masked, within the alert signal 132, by the alert state 414 of the UBD alert signal 128. As illustrated, the UBD alert signal 128 is in the alert state 414 from time t1 until time t4. The error detection signal 130 is in the alert state 414 after the end of the arbitration time period 604 at time t2 and until time t3, where t1<t2 and t3<t4 such that the alert state 414 of the error detection signal 130 is completely overlapped by the alert state 414 of the UBD alert signal 128. The resulting alert signal 132 comprises a pulse 606 lasting from t1' until t4' and with a pulse length equal to that of the UBD alert signal 128.

In this example, the alert state 414 of the error detection signal 130 is masked out by the alert state 414 of the UBD alert signal 128. Accordingly, the alert signal 132 is indicative of a UBD-related alert event and a possible error-related event. As discussed above, the memory controller 114 may communicate further with the memory device 108 to determine if there is an error-related event in addition to the UBD event. Other implementations can avoid this situation by setting the arbitration time period 604 to be as long as the longest alert pulse length (e.g., the pulse length of the UBD alert signal 128's alert state 414), such that the corresponding outgoing signal pulses within the alert signal 132 are sent in sequence responsive to any concurrent reception of alerts/errors.

In some implementations, the UBD alert signals 128 provided via the alert lead 124 may follow backoff timing parameters. For example, this may prevent a persistent die-level UBD alert signal 412 on the alert lead 124 in the presence of a persistent bank-level UBD alert signal 410. An example implementation of the UBD circuitry 118 including the backoff circuitry 126 is further described with respect to FIG. 7.

Figure 7:
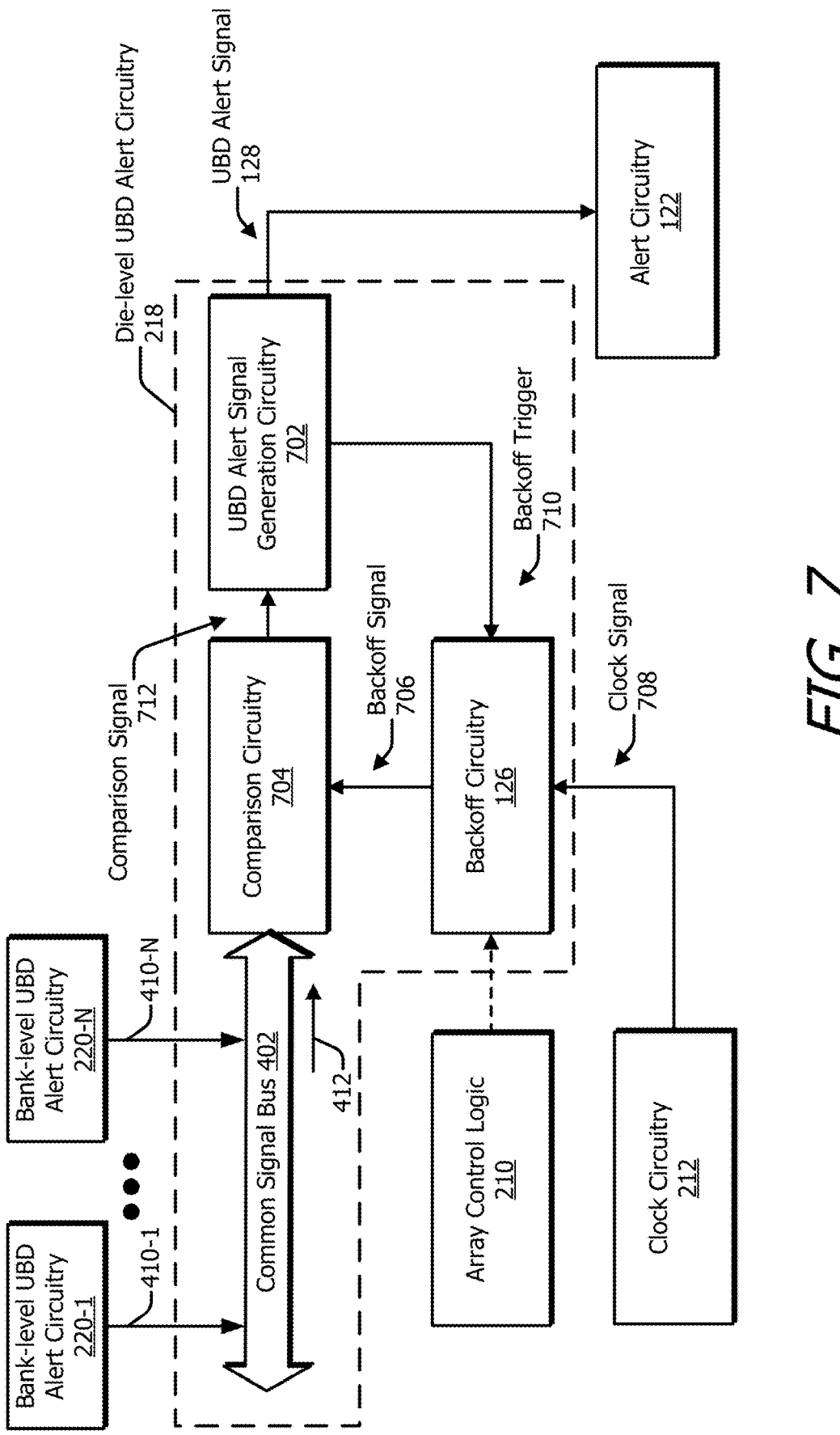
FIG. 7 illustrates an example die-level UBD alert circuitry including UBD alert signal generation circuitry, backoff circuitry, and comparison circuitry.

FIG. 7 illustrates an example die-level UBD alert circuitry 218 including the UBD alert signal generation circuitry 702, the backoff circuitry 126, and comparison circuitry 704. As illustrated, the backoff circuitry 126 is communicatively coupled to the UBD alert signal generation circuitry 702, the comparison circuitry 704, the array control logic 210, and/or the clock circuitry 212. The backoff circuitry 126 enables the UBD alert signal generation circuitry 702 to generate the UBD alert signal 128 in response to the bank-level UBD alert signals 410 while meeting timing parameters associated with the alert lead 124 (or the external interface). The UBD alert signal generation circuitry 702 is coupled to the common signal bus 402 via the comparison circuitry 704.

As described with respect to FIGS. 4A-B, the common signal bus 402 combines the bank-level UBD alert signals 410 from multiple memory banks 308. In some cases, a bank-level UBD alert signal 410 may persist in the alert state 414 for longer than a duration that is allowed on the alert lead 124. In other cases, multiple bank-level UBD alert signals 410 can be in the alert state 414 and cause the die-level UBD alert signal 412 on the common signal bus 402 to be in the alert state 414 for longer than the duration that is allowed on the alert lead. To address this issue, the backoff circuitry 126 limits a duration of the alert state 414 within the UBD alert signal 128.

Generally speaking, the backoff circuitry 126 generates a backoff signal 706. The backoff signal 706 has different states to indicate whether an alert event can be indicated using the UBD alert signal 128 or whether to have the UBD alert signal 128 backoff on indicating the alert event. The backoff circuitry 126 can determine an amount of time in which the backoff process occurs. In some implementations, the backoff circuitry 126 references a clock signal 708 provided by the clock circuitry 212 to manage a duration of the alert-backoff process.

The comparison circuitry 704 uses the backoff signal 706 to limit a duration of the alert state 414 within the die-level UBD alert signal 412 provided by the common signal bus 402. The comparison circuitry 704 outputs a comparison signal 712 based on the backoff signal 706 and the die-level UBD alert signal 412. The comparison signal 712 represents a combination of the backoff signal 706 and the die-level UBD alert signal 412. The comparison circuitry 704 can be implemented using logical 'AND' or 'NAND' gates configured to mask the die-level UBD alert signal 412 with the backoff signal 706.

The UBD alert signal generation circuitry 702 generates the UBD alert signal 128 based on the comparison signal 712. In some implementations, the UBD alert signal generation circuitry 702 may generate the UBD alert signal 128 for a time indicative of a quantity of UBD-related alert events. For example, the UBD alert signal generation circuitry 702 can retrieve a quantity of ongoing UBD-related alert events that is stored in a register 214 and use this value to modify a pulse length of the UBD alert signal 128 while meeting timing parameters associated with the alert lead 124.

Consider a situation in which the UBD alert signal generation circuitry 702 generates the UBD alert signal 128 with the alert state 414. At this time, the UBD alert signal generation circuitry 702 also generates a backoff trigger 710, which is provided to the backoff circuitry 126. The backoff trigger 710 causes the backoff circuitry 126 to activate the backoff process. The resulting backoff signal 706 causes the comparison circuitry 704 to induce the non-alert state within the comparison signal 712, regardless of whether the die-level UBD alert signal 412 is in the alert state 414. After a predetermine amount of time has passed, the backoff circuitry 126 halts the backoff process and enables subsequent alert events to be reported by the die-level UBD alert signal 412 to the UBD alert signal generation circuitry 702. The backoff signal 706, the comparison signal 712, and the UBD alert signal 128 are further described with respect to FIGS. 8 and 9.

Figure 8:
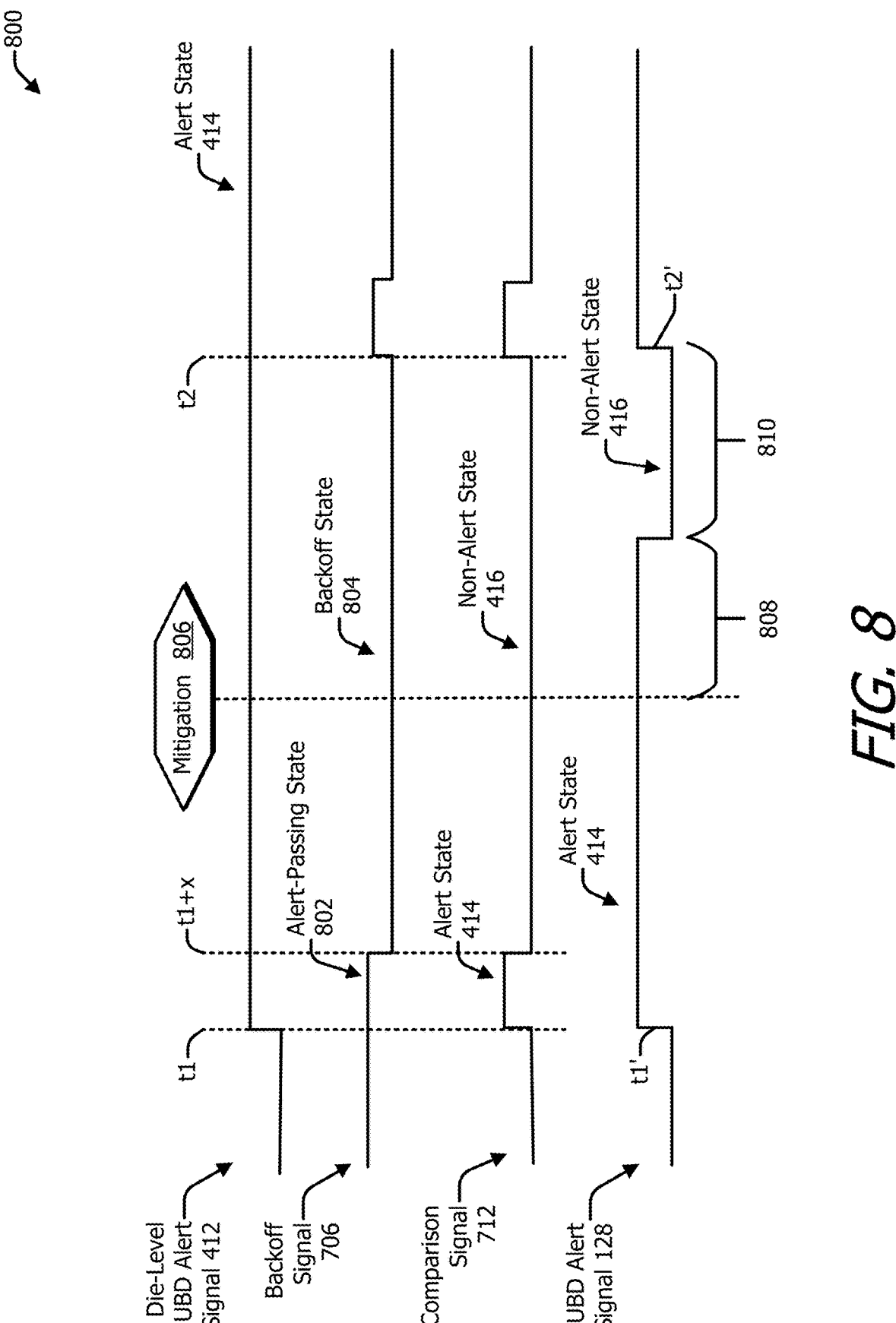
FIG. 8 illustrates a first example of UBD signal timing including backoff signal timing.
Figure 9:
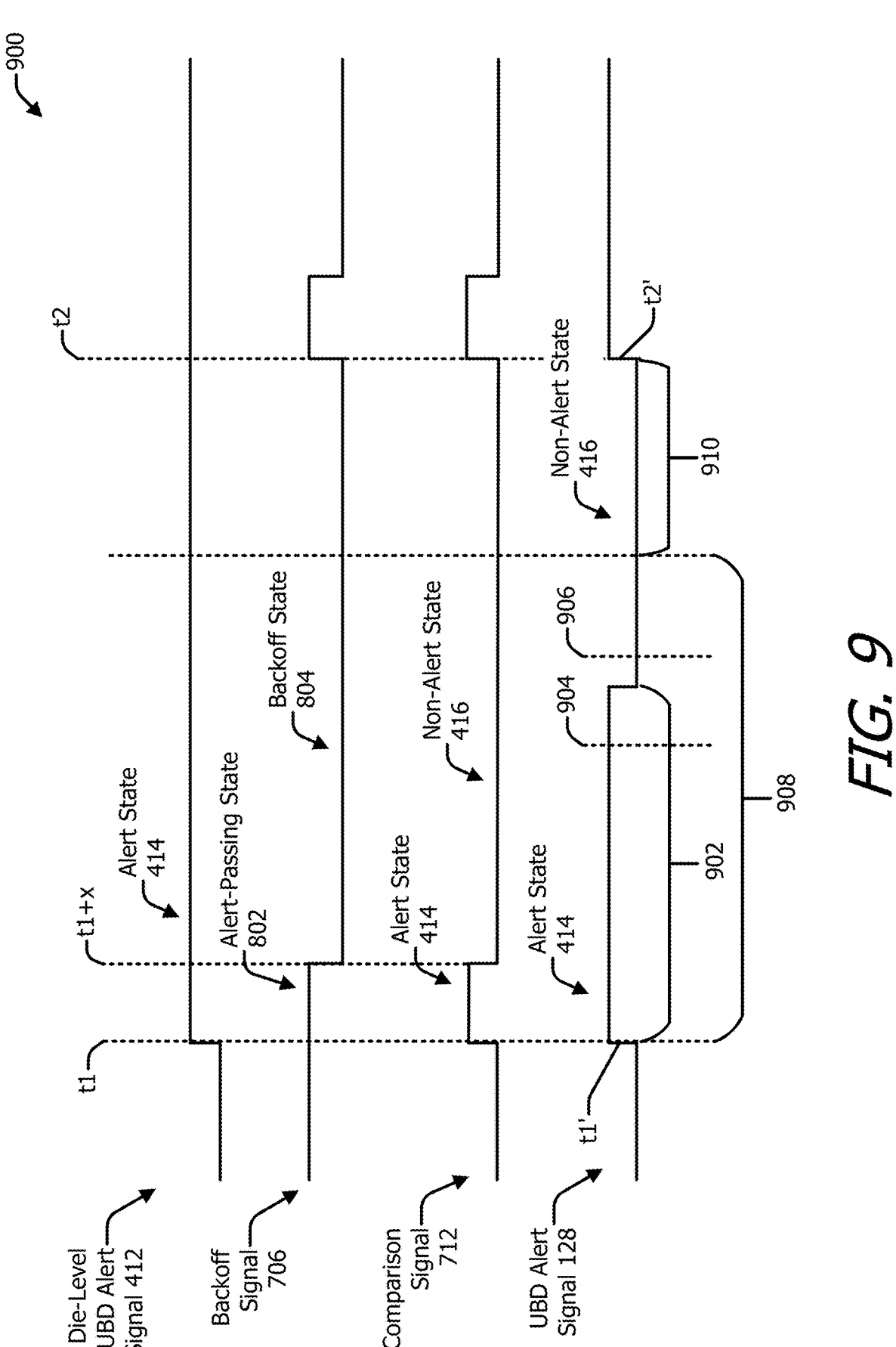
FIG. 9 illustrates a second example of UBD signal timing including backoff signal timing.

FIGS. 8 and 9 illustrate two example signal timing diagrams 800 and 900 in accordance with various implementations. In these examples, the comparison circuitry 704 performs a logical 'AND' operation on the backoff signal 706 and the die-level UBD alert signal 412. In these examples, the backoff signal 706 is in an alert-passing state 802 (e.g., a default state) at a high voltage and a backoff state 804 at a low or ground voltage. Other examples may utilize other voltages to communicate these states.

At 800, the die-level UBD alert signal 412 is in the alert state 414 starting at time t1. This may illustrate a situation with multiple ongoing UBD-related alert events on the different banks 308. Also at time t1, the backoff signal 706 is in the alert-passing state 802. The backoff signal 706 and the die-level UBD alert signal 412 causes the comparison signal 712 to be in the alert state 414 at time t1. The comparison signal 712 causes the UBD alert signal 128 to be in the alert state 414 at time t1'.

A transition of the UBD alert signal 128 from the non-alert state 416 to the alert state 414 at time t1' causes the UBD alert signal generation circuitry 702 to generate the backoff trigger 710. With the backoff trigger 710, the backoff circuitry 126 activates the backoff process. This causes the backoff circuitry 126 to generate the backoff signal 706 with the backoff state 804 at t1+x, where x indicates a minimum time period that the comparison signal 712 is in the alert state 414. For example, x may be one or more clock cycles or may be short enough that t1 and t1+x occur in a single clock cycle. After t1+x, the backoff signal 706 is in the backoff state 804 and the comparison signal 712 is in a non-alert state 416. Accordingly, the alert state 414 of the die-level UBD alert signal 412 is masked by the backoff state 804.

As illustrated, the UBD alert signal 128 is in the alert state 414 until a mitigation event 806 occurs. For example, the mitigation event 806 may be an occurrence of a threshold number of mitigation commands, such as row activations. As another example, the event 806 may be a signal received from the array control logic 210. The UBD alert signal 128 persists for a time period 808 following the mitigation event 806. For example, the time period 808 may be a minimum recovery time, which may be a programmable or preconfigured parameter. After the time period 808 has elapsed, the UBD alert signal 128 transitions to the non-alert state 416. In other examples, the time period 808 may be absent and the non-alert state 416 may be entered immediately following the mitigation event 806. The backoff circuitry 126 waits for a backoff time period 810 following the end of the alert state 414 within the UBD alert signal 128. Accordingly, the comparison signal 712 remains in the non-alert state 416 during the backoff time period 810. After the backoff time period 810, the backoff signal 706 returns to the alert-passing state 802 at t2. At t2, the alert-passing state 802 of the backoff signal 706 causes the UBD alert signal generation circuitry 702 to generate the UBD alert signal 128 having a second pulse at t2'. Other implementations of the die-level UBD alert circuitry 218 can generate the UBD alert signal 128 in another manner, as further described with respect to FIG. 9.

In the timing diagram 900 of FIG. 9, timing of the die-level UBD alert signal 412, the backoff signal 706, and the comparison signal 712 are similar to the timing shown at 800 in FIG. 8. The UBD alert signal 128 of FIG. 9, however, is generated in a different manner than the UBD alert signal 128 shown in FIG. 8.

As illustrated, the UBD alert signal 128 is in the alert state 414 for a time period 902 indicative of a count of UBD-related alert events. The time between a minimum pulse length 904 and a maximum pulse length 906 may be mapped to a number of potential UBD alert events that the memory device 108 may experience and enable the UBD alert signal 128 to meet the timing parameters associated with the alert lead 124. The backoff circuitry 126 waits for a time period 908 following the start of the UBD alert signal 128. For example, the time period 908 may be set according to a recovery period following the maximum possible pulse length 906. In some implementations, the backoff circuitry 126 may wait for the earlier of a threshold number of mitigation events or the time period 908.

The backoff circuitry 126 further waits for a delay time 910 following a transition-triggering occurrence (e.g., the time period 908). Accordingly, the comparison signal 712 remains in the non-alert state 416 during the delay time 910. After the delay time 910, the backoff signal 706 returns to the alert-passing state 802 at t2, which returns the comparison signal 712 to the alert state 414 because the die-level UBD alert signal 412 is in the alert state 414. Accordingly, the UBD alert signal generation circuitry 702 causes the UBD alert signal 128 to transition from the non-alert state 416 to the alert state 414 at t2', which triggers the generation of a second pulse.

Example Methods

Figure 10:
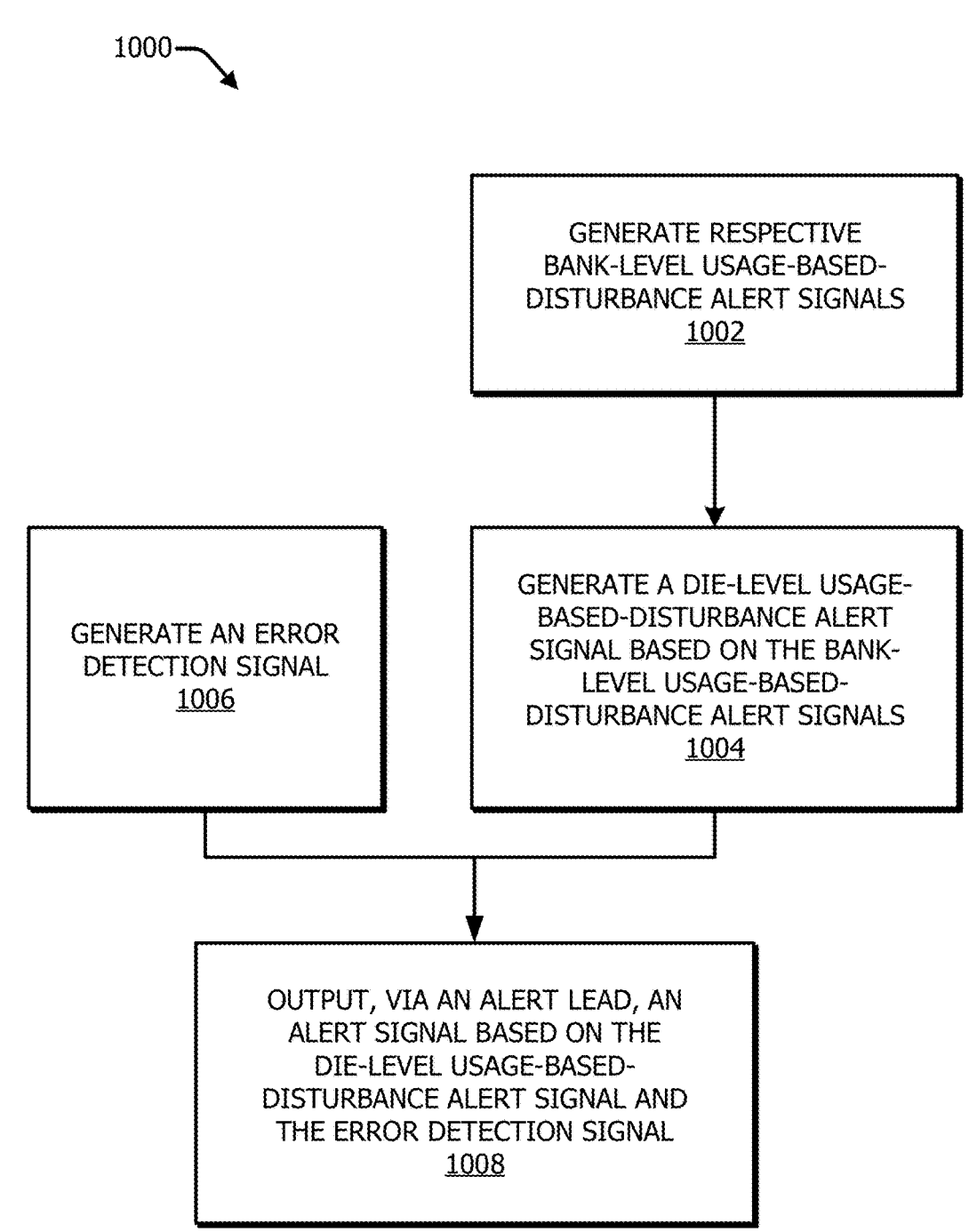
FIG. 10 illustrates a first example method for implementing aspects of UBD alert signaling.

This section describes example methods for implementing UBD alert signaling with reference to the flow diagrams of FIGS. 10-12. These descriptions may also refer to components, entities, and other aspects depicted in FIGS. 1A-9 by way of example only. The described methods are not necessarily limited to performance by one entity or multiple entities operating on one device.

FIG. 10 illustrates an example flow diagram 1000, which includes operations 1002 through 1008. In aspects, operations of the method 1000 are implemented by or with the UBD circuitry 118, the error detection circuitry 120, the alert circuitry 122, and the alert lead 124 as described with reference to FIGS. 1A-9. At 1002, bank-level UBD alert signals are generated. For example, the bank-level UBD alert circuitries 220 may each be configured to detect a UBD-related alert event and generate a respective bank-level UBD alert signal 410 in a manner that indicates the detection of the UBD-related alert event, as shown in FIG. 4A.

At 1004, a die-level UBD alert signal is generated based on the bank-level UBD alert signals. For example, the die-level UBD alert circuitry 218 combines the bank-level UBD alert signals 410 to generate the die-level UBD alert signal 412, as shown in FIG. 4A. The die-level UBD alert circuitry 218 can use a common signal bus 402 or a multiplexer to generate the die-level UBD alert signal 412 based on the bank-level UBD alert signals 410. In some examples, an alert state 414 of the die-level UBD alert signal 412 may be masked with a backoff signal 706, as shown in FIGS. 7-9.

At 1006, an error detection signal is generated. For example, the error detection circuitry 120 generates the error detection signal 130, as shown in FIGS. 1B and 4A. The error detection circuitry 120 may include CRC error detection circuitry that performs a cyclic redundancy check on a data input or a data output. In this example, the error detection circuitry 120 generates the error detection signal 130 in a manner that indicates detection of a cyclic redundancy check failure.

At 1008, an alert signal is outputted, via an alert lead, based on the die-level UBD alert signal and the error detection signal. For example, the alert circuitry 122 may output the alert signal 132 based on the die-level UBD alert signal 412 (or more generally the UBD alert signal 128) and the error detection signal, as shown in FIGS. 1B and 4A. The alert circuitry 122 can be implemented using the combinatorial alert circuitry 502, as described in FIG. 5, or the sequential alert circuitry 602, as described with respect to FIG. 6.

FIG. 11 illustrates an example flow diagram 1100, which includes operations 1102 through 1104. In aspects, operations of the method 1100 are implemented by or with the alert circuitry 122 and the alert lead 124, as described with reference to FIGS. 1A-9.

At 1102, an alert signal is transmitted on a lead of a die of a memory device. The first alert signal has a first pulse indicating detection of a bank-level alert event associated with UBD. The first pulse has a first pulse length. For example, the alert circuitry 122 transmits, on the alert lead 124 of the die 304, the alert signal 132, as shown in FIG. 1B. The alert signal 132 has a first pulse that indicates detection of a bank-level alert event associated with UBD. The first pulse represents a first instance of the alert state 414 of the alert signal 132. The alert state 414 can be associated with a high voltage or a low voltage depending on the implementation. In this example, the alert signal 132 indicates the presence of a UBD-related alert event on at least one of the banks 308 within a die 304. The first pulse length may be indicative of a number of UBD-related alert events, as shown in FIG. 9.

At 1104, the alert signal is transmitted on the lead having a second pulse indicating detection of an error event that differs from the bank-level alert event. The second pulse has a second pulse length that is different from the first pulse length. For example, the alert circuitry 122 transmits, on the alert lead 124 of the die 304, the alert signal 132, as shown in FIG. 1B. The alert signal 132 has a second pulse that indicates an error event that is not associated with UBD. For example, the error event can represent a cyclic redundancy check failure.

In the case that the UBD-related alert event and the error event occur at different times in a non-overlapping manner, the first pulse and the second pulse can be separated in time. However, if another UBD-related alert event and another error event occur in at least a partially overlapping manner, the alert circuitry 122 can generate a single pulse or separate pulses depending on the implementations, as described with respect to FIGS. 5A-6D.

FIG. 12 illustrates an example flow diagram 1200, which includes operations 1202 through 1210. In aspects, operations of the method 1200 are implemented by or with the UBD circuitry 118 as described with reference to FIGS. 1B and 7. At 1202, a die-level usage-based-disturbance alert signal having an alert state or a non-alert state is generated. The alert state indicates detection of a usage-based-disturbance alert event within at least one bank of a die of a memory device. For example, the die-level UBD alert circuitry 218 generates the die-level UBD alert signal 412 having the alert state 414 or the non-alert state 416, as shown in FIGS. 4A and 4B. The alert state 414 of the die-level UBD alert signal 412 indicates that a UBD-related alert event is detected by at least one of the bank-level UBD alert circuitries 220. In this manner, the alert state 414 indicates detection of the UBD alert event within at least one bank 308 of the die 304 of the memory device 108.

At 1204, a backoff signal having a blocking state or an alert-passing state is monitored. For example, the die-level UBD alert circuitry 218 monitors a state of the backoff signal 706, as shown in FIG. 7. The backoff signal 706 can have the backoff state 804 or the alert-passing state 802, as shown in FIGS. 8 and 9.

At 1208, a UBD alert signal is generated based on the die-level usage-based-disturbance alert signal and the backoff signal. The UBD alert signal has the alert state responsive to the die-level usage-based-disturbance alert signal having the alert state and the backoff signal having the alert-passing state. For example, the die-level UBD alert circuitry 218 generates the UBD alert signal 128 based on the die-level UBD alert signal 412 and the backoff signal 706, as shown in FIG. 7. The UBD alert signal 128 has the alert state 414 responsive to the die-level UBD alert signal 412 having the alert state 414 and the backoff signal 706 having the alert-passing state 802, as shown in FIGS. 8 and 9.

At 1210, the backoff state of the backoff signal is induced for a time period responsive to the UBD alert signal transitioning from the non-alert state to the alert state. For example, the die-level UBD alert circuitry 218 induces the backoff state 804 of the backoff signal 706 for a time period responsive to the UBD alert signal 128 transitioning from the non-alert state 416 to the alert state 414.

For the figures described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1A-9, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of UBD alert signaling are described:

Example 1: An apparatus comprising:

a plurality of bank-level usage-based-disturbance alert circuitries configured to generate respective bank-level usage-based-disturbance alert signals;

die-level usage-based-disturbance alert circuitry coupled to outputs of the plurality of bank-level usage-based-disturbance alert circuitries and configured to generate a die-level usage-based-disturbance alert signal based on the bank-level usage-based-disturbance alert signals;

error detection circuitry configured to generate an error detection signal;

an alert lead; and alert circuitry coupled to an output of the die-level usage-based-disturbance alert circuitry, an output of the error detection circuitry, and the alert lead, the alert circuitry configured to output, via the alert lead, an alert signal based on the die-level usage-based-disturbance alert signal and the error detection signal.

Example 2: The apparatus of example 1 or any other example, wherein:

the plurality of bank-level usage-based-disturbance alert circuitries are each configured to detect a usage-based-disturbance-related alert event and generate the respective bank-level usage-based-disturbance alert signal in a manner that indicates the detection of the usage-based-disturbance-related alert event;

the die-level usage-based-disturbance circuitry comprises a common signal bus coupled to the outputs of the plurality of bank-level usage-based-disturbance circuitries; and the die-level usage-based-disturbance circuitry is configured to generate, using the common signal bus, the die-level usage-based-disturbance alert signal in a manner that indicates the detection of the usage-based-disturbance-related alert event responsive to one or more of the bank-level usage-based-disturbance alert signals indicating the detection of the usage-based-disturbance-related alert event.

Example 3: The apparatus of example 1 or any other example, wherein the alert circuitry is configured to generate the alert signal in a manner that indicates an alert state responsive to at least one of the die-level usage-based-disturbance alert signal having the alert state or the error detection signal having the alert state.

Example 4: The apparatus of example 3 or any other example, wherein the alert circuitry comprises a logic gate configured to perform a NOR operation on the die-level usage-based-disturbance alert signal and the error detection signal to generate the alert signal.

Example 5: The apparatus of example 1 or any other example, wherein the alert circuitry is configured to generate the alert signal having sequential pulses responsive to the die-level usage-based-disturbance alert signal and the error detection signal having an alert state within an arbitration delay time of each other.

Example 6: The apparatus of example 5 or any other example, wherein the alert circuitry is configured to separate the sequential pulses in time by a predetermined delay time.

Example 7: The apparatus of example 1 or any other example, wherein:

a combination of one or more of the bank-level usage-based-disturbance alert signals is in an alert state for a first duration indicating one or more alerts; and the die-level usage-based-disturbance alert circuitry is configured to limit a duration that the die-level usage-based-disturbance alert signal is in the alert state such that the die-level usage-based-disturbance alert signal is in the alert state for a second duration that is shorter than the first duration.

Example 8: The apparatus of example 7 or any other example, wherein:

the die-level usage-based-disturbance alert circuitry is configured to suppress the one or more alerts associated with the one or more bank-level usage-based-disturbance alert signals for a predefined amount of time.

Example 9: The apparatus of example 1 or any other example, wherein:

the error detection circuitry is configured to:

detect a cyclic redundancy check failure; and generate the error detection signal in a manner that indicates the cyclic redundancy check failure.

Example 10: A method comprising:

transmitting, on a lead of a die of a memory device, an alert signal having a first pulse indicating detection of a bank-level alert event associated with usage-based disturbance, the first pulse having a first pulse length; and transmitting, on the lead, the alert signal having a second pulse indicating detection of an error event that differs from the bank-level alert event, the second pulse having a second pulse length that is different than the first pulse length.

Example 11: The method of example 10 or any other example, wherein the error event is associated with data that is read from or written to the memory device.

Example 12: The method of example 10 or any other example, further comprising:

transmitting, on the lead, the alert signal having a third pulse indicating detection of a second bank-level alert event associated with the usage-based disturbance and a second error event, the third pulse having a third pulse length equal to a sum of an overlapping duration and a non-overlapping duration of the second bank-level alert event and the second error event.

Example 13: The method of example 10 or any other example, further comprising:

initially detecting one of a second bank-level alert event or a second error event;

subsequently detecting the other one of the second bank-level alert event or the second alert event, the subsequent detecting of the other event occurring during a time of the initially detected event; and transmitting the alert signal having a third pulse to represent the initially detected event and a fourth pulse to indicate the subsequent detection of the other event, the third and fourth pulses separated in time by a predetermined amount.

Example 14: The method of example 13 or any other example, wherein:

the subsequently detecting occurs within an arbitration time of the initially detected event; and the arbitration time has a duration between a duration of the third pulse and a duration of the fourth pulse.

Example 15: The method of example 10 or any other example, further comprising:

detecting, at a first time, a bank-level usage-based alert state;

inducing, for a blocking time period, a blocking state of a backoff signal responsive to detecting the bank-level usage-based alert state;

transmitting the first pulse of the alert signal responsive to detecting the bank-level usage based alert state;

detecting, at a second time, the bank-level usage-based alert state; and transmitting a third pulse of the alert signal responsive to detecting, at the second time, the bank-level usage-based alert state and responsive to detecting an absence of the blocking state.

Example 16: A method comprising:

generating a die-level usage-based-disturbance alert signal having an alert state or a non-alert state, the alert state indicating detection of a usage-based-disturbance alert event within at least one bank of a die of a memory device;

monitoring a backoff signal having a blocking state or an alert-passing state;

generating a usage-based-disturbance alert signal based on the die-level usage-based-disturbance alert signal and the backoff signal, the usage-based-disturbance alert signal having the alert state responsive to the die-level usage-based-disturbance alert signal having the alert state and the backoff signal having the alert-passing state; and inducing the backoff state of the backoff signal for a time period responsive to the usage-based-disturbance alert signal transitioning from the non-alert state to the alert state.

Example 17: The method of example 16 or any other example, further comprising:

transmitting the usage-based-disturbance alert signal from the memory device to a memory controller using an alert lead, wherein the generating of the usage-based-disturbance alert signal comprises causing the usage-based-disturbance alert signal to have a pulse with a pulse length that is limited by the induced backoff state, the pulse length satisfying a timing parameter associated with an interface between the memory device and the memory controller.

Example 18: The method of example 17 or any other example, further comprising:

generating an error detection signal indication detection of a non-usage-based-disturbance-related event; and transmitting the error detection signal from the memory device to the memory controller using the alert lead.

Example 19: The method of example 16 or any other example, wherein the generating of the usage-based-disturbance alert signal comprises combining the die-level usage-based-disturbance alert signal and the backoff signal using a logical AND operation.

Example 20: The method of example 16 or any other example, wherein the generating of the usage-based-disturbance alert signal comprises causing the alert state of the usage-based-disturbance alert signal to occur for a shorter duration than the alert state of the die-level usage-based-disturbance alert signal.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although aspects of implementing UBD alert signaling have been described in language specific to certain features and/or methods, the subject of the appended claims is not necessarily limited to the specific features or methods described. Rather, the specific features and methods are disclosed as a variety of example implementations of implementing UBD alert signaling.

What is claimed is:

1. An apparatus comprising:
   a memory device comprising:
      at least one die, the at least one die comprising:
         a plurality of banks;
         a plurality of bank-level usage-based-disturbance alert circuitries configured to generate respective bank-level usage-based-disturbance alert signals corresponding to the respective plurality of banks; and
         die-level usage-based-disturbance alert circuitry coupled to outputs of the plurality of bank-level usage-based-disturbance alert circuitries and configured to generate a die-level usage-based-disturbance alert signal based on the bank-level usage-based-disturbance alert signals; error detection circuitry configured to generate an error detection signal; an alert lead; and
      alert circuitry coupled to an output of the die-level usage-based-disturbance alert circuitry, an output of the error detection circuitry, and the alert lead, the alert circuitry configured to output, via the alert lead, an alert signal based on the die-level usage-based-disturbance alert signal and the error detection signal.

2. The apparatus of claim 1, wherein:
   the plurality of bank-level usage-based-disturbance alert circuitries are each configured to detect a usage-based-disturbance-related alert event and generate one of the bank-level usage-based-disturbance alert signals in a manner that indicates the detection of the usage-based-disturbance-related alert event;
   the die-level usage-based-disturbance circuitry comprises a common signal bus coupled to the outputs of the plurality of bank-level usage-based-disturbance circuitries; and
   the die-level usage-based-disturbance circuitry is configured to generate, using the common signal bus, the die-level usage-based-disturbance alert signal in a manner that indicates the detection of the usage-based-disturbance-related alert event responsive to one or more of the bank-level usage-based-disturbance alert signals indicating the detection of the usage-based-disturbance-related alert event.

3. The apparatus of claim 1, wherein the alert circuitry is configured to generate the alert signal in a manner that indicates an alert state responsive to at least one of the die-level usage-based-disturbance alert signal having the alert state or the error detection signal having the alert state.

4. The apparatus of claim 3, wherein the alert circuitry comprises a logic gate configured to perform a NOR operation on the die-level usage-based-disturbance alert signal and the error detection signal to generate the alert signal.

5. The apparatus of claim 1, wherein the alert circuitry is configured to generate the alert signal having sequential pulses responsive to the die-level usage-based-disturbance alert signal and the error detection signal having an alert state within an arbitration delay time of each other.

6. The apparatus of claim 5, wherein the alert circuitry is configured to separate the sequential pulses in time by a predetermined delay time.

7. The apparatus of claim 1, wherein:
   a combination of one or more of the bank-level usage-based-disturbance alert signals is in an alert state for a first duration indicating one or more alerts; and
   the die-level usage-based-disturbance alert circuitry is configured to limit a duration that the die-level usage-based-disturbance alert signal is in the alert state such that the die-level usage-based-disturbance alert signal is in the alert state for a second duration that is shorter than the first duration.

8. The apparatus of claim 7, wherein:

the die-level usage-based-disturbance alert circuitry is configured to suppress the one or more alerts associated with the one or more bank-level usage-based-disturbance alert signals for a predefined amount of time.

9. The apparatus of claim 1, wherein:

the error detection circuitry is configured to:

detect a cyclic redundancy check failure; and generate the error detection signal in a manner that indicates the cyclic redundancy check failure.

10. A method comprising:

transmitting, on a lead of a die of a memory device, an alert signal having a first pulse indicating detection of a bank-level alert event associated with usage-based disturbance, the first pulse having a first pulse length; and transmitting, on the lead, the alert signal having a second pulse indicating detection of an error event that differs from the bank-level alert event, the second pulse having a second pulse length that is different than the first pulse length.

11. The method of claim 10, wherein the error event is associated with data that is read from or written to memory device.

12. The method of claim 10, further comprising:

transmitting, on the lead, the alert signal having a third pulse indicating detection of a second bank-level alert event associated with the usage-based disturbance and a second error event, the third pulse having a third pulse length equal to a sum of an overlapping duration and a non-overlapping duration of the second bank-level alert event and the second error event.

13. The method of claim 10, further comprising:

initially detecting one of a second bank-level alert event or a second error event;

subsequently detecting the other one of the second bank-level alert event or the second alert event, the subsequent detecting of the other event occurring during a time of the initially detected event; and transmitting the alert signal having a third pulse to represent the initially detected event and a fourth pulse to indicate the subsequent detection of the other event, the third and fourth pulses separated in time by a predetermined amount.

14. The method of claim 13, wherein:

the subsequent detecting occurs within an arbitration time of the initially detected event; and the arbitration time has a duration between a duration of the third pulse and a duration of the fourth pulse.

15. The method of claim 10, further comprising:

detecting, at a first time, a bank-level usage-based alert state;

inducing, for a blocking time period, a blocking state of a backoff signal responsive to detecting the bank-level usage-based alert state;

transmitting the first pulse of the alert signal responsive to detecting the bank-level usage based alert state;

detecting, at a second time, the bank-level usage-based alert state; and transmitting a third pulse of the alert signal responsive to detecting, at the second time, the bank-level usage-based alert state and responsive to detecting an absence of the blocking state.

16. A method comprising:

generating a die-level usage-based-disturbance alert signal having an alert state or a non-alert state, the alert state indicating detection of a usage-based-disturbance alert event within at least one bank of a die of a memory device;

monitoring a backoff signal having a blocking state or an alert-passing state;

generating a usage-based-disturbance alert signal based on the die-level usage-based-disturbance alert signal and the backoff signal, the usage-based-disturbance alert signal having the alert state responsive to the die-level usage-based-disturbance alert signal having the alert state and the backoff signal having the alert-passing state; and inducing the backoff state of the backoff signal for a time period responsive to the usage-based-disturbance alert signal transitioning from the non-alert state to the alert state.

17. The method of claim 16, further comprising:

transmitting the usage-based-disturbance alert signal from the memory device to a memory controller using an alert lead, wherein the generating of the usage-based-disturbance alert signal comprises causing the usage-based-disturbance alert signal to have a pulse with a pulse length that is limited by the induced backoff state, the pulse length satisfying a timing parameter associated with an interface between the memory device and the memory controller.

18. The method of claim 17, further comprising:

generating an error detection signal indication detection of a non-usage-based-disturbance-related event; and transmitting the error detection signal from the memory device to the memory controller using the alert lead.

19. The method of claim 16, wherein the generating of the usage-based-disturbance alert signal comprises combining the die-level usage-based-disturbance alert signal and the backoff signal using a logical AND operation.

20. The method of claim 16, wherein the generating of the usage-based-disturbance alert signal comprises causing the alert state of the usage-based-disturbance alert signal to occur for a shorter duration than the alert state of the die-level usage-based-disturbance alert signal.

* * * * *